US012638855B2

(12) United States Patent
Patel

(10) Patent No.: US 12,638,855 B2
(45) Date of Patent: May 26, 2026

(54) CONTROL SYSTEM AND METHOD FOR VERIFYING REMOTE OPERATION OF A MOTOR VEHICLE

(71) Applicant: JAGUAR LAND ROVER LIMITED, Whitley (GB)

(72) Inventor: Jitesh Patel, Whitley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 325 days.

(21) Appl. No.: 18/546,958

(22) PCT Filed: Feb. 18, 2022

(86) PCT No.: PCT/EP2022/054126
§ 371 (c)(1),
(2) Date: Aug. 17, 2023

(87) PCT Pub. No.: WO2022/175475
PCT Pub. Date: Aug. 25, 2022

(65) Prior Publication Data
US 2024/0126279 A1 Apr. 18, 2024

(30) Foreign Application Priority Data

Feb. 19, 2021 (GB) ...................................... 2102334

(51) Int. Cl.
*G05D 1/226* (2024.01)
*B60W 30/06* (2006.01)
(Continued)

(52) U.S. Cl.
CPC ............. *G05D 1/226* (2024.01); *B60W 30/06* (2013.01); *G05D 1/87* (2024.01); *G05D 2109/10* (2024.01)

(58) Field of Classification Search
CPC .......... B60W 30/06; G05D 1/226; G05D 1/87
See application file for complete search history.

(56) References Cited

U.S. PATENT DOCUMENTS 11,886,185 B2 * 1/2024 Suzuki ................. G05D 1/0016
11,966,458 B2 * 4/2024 Ujiie ....................... G06F 21/33
(Continued)

FOREIGN PATENT DOCUMENTS

CN          104363266 A      2/2015
CN          110263508 A      9/2019
(Continued)

OTHER PUBLICATIONS

Great Britain Intellectual Property Office, Combined Search and Examination Report under Sections 17 and 18(3) Issued in Application No. GB2102334.6, Jul. 29, 2021, 6 pages.
(Continued)

*Primary Examiner* — Luke Huynh
(74) *Attorney, Agent, or Firm* — McCoy Russell LLP

(57) ABSTRACT

A control system is configured to: transmit a verification request signal to a remote device; listen for a verification request reply signal transmitted from the remote device in response to the verification request signal being transmitted; listen for a remote device state signal transmitted from the remote device providing remote device state information indicating in which predefined state the remote device is currently operating, the operation information based on the remote device state information; determine whether information comprised by the verification request reply signal includes expected operation result information being operation result information corresponding to an expected result of the operation defined by the operation information; and control, or provide input to the system to control, motion of the vehicle in response to the motion control signal received from the remote device based on a correspondence between the received operation result information and the expected operation result information.

20 Claims, 14 Drawing Sheets

(51) Int. Cl.
 G05D 1/87 (2024.01)
 G05D 109/10 (2024.01)

(56) References Cited

U.S. PATENT DOCUMENTS

| | | | |
|---|---|---|---|
| 12,043,249 B2 * | 7/2024 | Sannodo | G05D 1/223 |
| 2016/0304087 A1 | 10/2016 | Noh | |
| 2018/0364697 A1 | 12/2018 | Elangovan et al. | |
| 2020/0198620 A1 | 6/2020 | Nakata | |
| 2020/0294325 A1 * | 9/2020 | Mueller-Lerwe | H04L 67/125 |

FOREIGN PATENT DOCUMENTS

| | | | |
|---|---|---|---|
| EP | 3562172 A1 | 10/2019 | |
| JP | 2020147064 A | 9/2020 | |

OTHER PUBLICATIONS

ISA European Patent Office, International Search Report Issued in Application No. PCT/EP2022/054126, May 19, 2022, WIPO, 4 pages.

* cited by examiner

| Op_Idx | Operation | Applicable_to_RD_DeviceStatus | OperationAllowed | Final_Challenge | Challenge_Operation | Expected_result |
|---|---|---|---|---|---|---|
| 0 | Add | 1,2,5 | 0 | | | |
| 1 | Subtract | 2 | 0 | | | |
| 2 | Multiply | 3,4,6 | 1 | | | |
| 3 | Divide | 3,4,5 | 0 | | | |
| 4 | Power | 1,2,3 | 0 | | | |
| 5 | Logical_And | 1 | 0 | | | |
| 6 | Logical_Or | 2,4,6 | 1 | | | |
| 7 | Logical_Xor | 1,3,5 | 0 | | | |
| 8 | ComplexFunction1 | 1,4,5 | 0 | | | |
| 9 | ComplexFunction2 | 3 | 0 | | | |
| 10 | ComplexFunction3 | 2,5,6 | 1 | | | |
| 11 | ComplexFunction4 | 3,5,6 | 1 | | | |
| 12 | ComplexFunction5 | 4 | 0 | | | |
| 13 | ComplexFunction6 | 1,5,6 | 1 | | | |
| 14 | ComplexFunction7 | 2,3,6 | 1 | | | |
| 15 | ComplexFunction8 | 6 | 1 | | | |

CONTROL SYSTEM AND METHOD FOR VERIFYING REMOTE OPERATION OF A MOTOR VEHICLE

CROSS REFERENCE TO RELATED APPLICATIONS

The present application is a U.S. National Phase of International Application No. PCT/EP2022/054126 entitled "CONTROL SYSTEM AND METHOD," and filed on Feb. 18, 2022. International Application No. PCT/EP2022/054126 claims priority to Great Britain Patent Application No. 2102334.6 filed on Feb. 19, 2021. The entire contents of each of the above-listed applications are hereby incorporated by reference for all purposes.

TECHNICAL FIELD

The present disclosure relates to a control system for a vehicle and to a method of controlling a vehicle and particularly, but not exclusively, to a control system for permitting remote control of vehicle movement. Aspects of the invention relate to a control system, a system, a vehicle, a method, a computer software program and a computer-readable storage medium.

BACKGROUND

It is known to provide a vehicle park assist system for assisting a user in parking a vehicle. Some park assist systems are configured to provide an automatic parking function in which the vehicle park assist system is configured to control vehicle speed and steering autonomously in order to perform a parallel parking operation without a driver being required to provide any speed or directional control input to the vehicle. Some systems are configured to allow automatic perpendicular parking and garage parking. Some systems allow small adjustments to be made to vehicle position in which the vehicle is caused to move forward or backward by relatively small amounts, a feature known as 'nudge' movement.

The present applicant has recognised that it may be desirable to allow a driver to activate the automatic parking function remotely, by means of a remote device such as a smartphone, smartwatch or other device such as a key fob with a touchscreen, the remote device running a suitable software application (which may be referred to as an 'app' or 'widget'). It may also be desirable to permit a driver to control vehicle movement separately by controlling direction of travel, speed and steering angle by means of the same or a similar device. This function may be particularly useful in off-road situations in which a vehicle is required to navigate challenging terrain. The present applicant has also recognised that it is important to ensure reliability of systems for controlling vehicle movement, particularly if operated remotely. The present inventors have recognised that a communications failure between the smartphone and park assist control system could cause control of the vehicle to become unreliable. It is an aim of the present invention to ameliorate this problem.

SUMMARY OF THE INVENTION

Aspects and embodiments of the invention provide a control system, a remote device and a method of controlling motion of a vehicle as claimed in the appended claims.

According to an aspect of the present invention there is provided a control system comprising one or more controllers, the control system arranged to control, or provide input to a system to control, motion of a motor vehicle in response to a motion control signal received from a remote device, wherein the control system is arranged to perform a verification cycle in which the control system is configured to: transmit a verification request signal to the remote device; listen for a verification request reply signal transmitted from the remote device in response to the verification request signal transmitted; listen for a remote device state signal transmitted from the remote device providing remote device state information indicating in which one of a plurality of predefined states the remote device is currently operating, wherein the verification request signal comprises information that includes operation information indicative of an operation to be performed, the operation information being dependent on the remote device state information, the control system being further configured to determine whether information comprised by the verification request reply signal received from the remote device includes expected operation result information being operation result information corresponding to the expected result of the operation defined by the operation information provided in the verification request signal, wherein the control system is configured to control, or provide input to the system to control, motion of the vehicle in response to the motion control signal received from the remote device in dependence on a correspondence between the received operation result information and the expected operation result information.

Embodiments of the present invention have the advantage that, because the control system is able to tailor the operation to be performed to the current operational state of the remote device, a less computationally intensive operation (which may, for example, comprise one or more calculations such as division or multiplication) may be required to be performed by the remote device in order to verify correct operation of the remote device when the device is in certain one or more states, in which the device is not required to perform computationally intensive operations as part of the provision of remote control functionality, relative to that required when the device is in certain other states. By way of example, in some embodiments the remote device may be provided with a touchscreen. In certain device states the remote device may be required to undertake computationally intensive operations in order to provide the control system with information indicative, for example, of user finger position on the touchscreen and/or direction and/or speed of movement of the user's finger, in order to facilitate vehicle control. In other states, the remote device may simply be required to provide an indication to the control system when a button displayed on the touchscreen is pressed. It is to be understood that, in the latter state, the remote device may be required to perform less computationally intensive operations relative to the former state. Accordingly, the verification cycle in the latter state may require the remote device to perform a less computationally intensive operation relative to the former state, in order adequately to verify that the remote device is operating sufficiently well to be permitted to continue providing input to a vehicle control procedure.

Optionally, the one or more controllers collectively comprise: at least one electronic processor having an electrical input for receiving the verification request reply signal and remote device state signal and an electrical output for transmitting the verification request signal; and at least one memory device coupled to the at least one electronic processor and having instructions stored therein; wherein the at least one electronic processor is configured to access the at least one memory device and execute the instructions stored therein so as to control, or provide input to a system to control, motion of the motor vehicle.

Optionally, the operation information being dependent on the remote device state information comprises the operation information being selected from a corresponding predetermined group of one or more operations associated with each of the said plurality of predefined states in which the remote device may operate. Optionally, the one or more operations of each respective group of one or more operations are configured to cause the remote device to perform an operation that is expected to be performed by the remote device when it is operating in the corresponding predefined state as part of normal operation in that predefined state. It is to be understood that, in some embodiments, each of the one or more operations of each respective group of one or more operations are such that it might be performed by the remote device when it is operating in the corresponding predefined state as part of normal operation in that predefined state. Thus, one or more operations that would not be expected to be performed when the device is in a given state would not be part of the group of one or more operations associated with that state. Optionally, the one or more operations are selected from amongst: addition, subtraction, multiplication, division, calculation of a value to a predetermined power (such as power 2 or power 3 and so forth), logical AND, logical OR, and logical XOR.

Some embodiments of the present invention have the advantage that testing of the remote device when it is operating in a given predefined state does not require the remote device to perform operations that the device is not expected to perform as part of normal operation in that state. Thus, a computational burden placed on the remote device by the control system when confirming correct operation of the remote device is not excessive in the context of the states in which the remote device is operating.

It is to be understood that the group of one or more operations of each respective group of one or more operations may be configured to cause the remote device to execute, between them, substantially all logical operations that may be expected to be performed whilst operating in that state.

Optionally, the system is configured to determine expected operation result information and store the expected operation result information together with a respective identifier in a memory associated with the control system, the system being configured to include, in the verification request signal, identifier information being information indicative of the identifier associated with the operation information comprised by the verification request signal, wherein the system being configured to determine whether information comprised by the verification request reply signal received from the remote device includes expected operation result information comprises the system being configured to compare received result information and stored expected result information associated with the same identifier information.

Optionally, the system is configured wherein once a verification request reply signal has been received having identifier information therein and the system has compared received result information and stored expected result information associated with that identifier information, the system is configured not to compare further received expected result information associated with that identifier information until fresh expected result information has been stored corresponding to that identifier information. Optionally, the system is configured wherein once a verification request reply signal has been received having identifier information therein and the system has compared received result information and corresponding stored expected result information associated with that identifier information, the system is configured to delete the stored expected result information and corresponding identifier information from memory. Optionally, the system is configured to prevent motion of the vehicle in response to a motion control signal received from the remote device in dependence on a number of times a verification request reply signal is received by the system within a prescribed time period where the received result information does not correspond to the corresponding stored expected result information. Optionally, the system is configured to prevent motion of the vehicle in response to a motion control signal received from the remote device in dependence on whether the order in which successive verification request reply signals are received corresponds to the order in which successive verification request signals were transmitted. Optionally, the system is configured to prevent motion of the vehicle in response to a motion control signal received from the remote device in dependence on a number of times within a given time period the order in which successive verification request reply signals are received does not correspond to the order in which successive verification request signals were transmitted. Optionally, the system is configured to implement a cyclic redundancy check (CRC) in respect of data received. Optionally, the verification request signal further comprises argument information indicative of one or more arguments to be employed in the operation to be performed.

In a further aspect of the invention there is provided a method of controlling motion of a vehicle by means of a control system, the method comprising controlling, or providing input to a system to control, motion of a motor vehicle in response to a motion control signal received from a remote device, the method comprising performing a repeating verification cycle, the method comprising: transmitting a verification request signal to the remote device; listening for a verification request reply signal transmitted from the remote device in response to the verification request signal transmitted; listening for a remote device state signal transmitted from the remote device providing remote device state information indicating in which one of a plurality of predefined states the remote device is currently operating, whereby the verification request signal comprises information that includes operation information indicative of an operation to be performed, the operation information being dependent on the remote device state information, the method further comprising determining whether information comprised by the verification request reply signal received from the remote device includes expected operation result information being operation result information corresponding to the expected result of the operation defined by the operation information provided in the verification request signal, the method further comprising controlling, or provide input to a system to control, motion of the vehicle in response to a motion control signal received from the remote device in dependence on a correspondence between the received operation result information and the expected operation result information.

Optionally, the method comprises preventing vehicle movement responsive to a motion control signal received from the remote computing device in dependence on receipt of the expected verification request reply signal. Optionally, the verification request signal further comprises argument information indicative of one or more arguments to be employed in the operation to be performed.

In a still further aspect of the invention there is provided remote device configured to communicate with a control system arranged to control, or provide input to a system to control, motion of a motor vehicle in response to a motion control signal received from the remote device, wherein the remote device is configured to: transmit to the control system a remote device state signal providing information indicating in which one of a plurality of predefined states the remote device is currently operating, listen for a verification request signal transmitted by the control system, wherein the verification request signal comprises information that includes operation information indicative of a operation to be performed; in response to receipt of a verification request signal transmitted by the control system, perform the indicated predefined operation, the device being configured to transmit the verification request reply signal in response to receipt of the verification request signal after performing the predefined operation, the verification request reply signal comprising information indicative of the result of the indicated predefined operation.

Optionally, the remote device is configured to receive a verification request signal further comprising argument information for the operation to be performed, the remote device being configured to perform the predefined operation using the received argument information. Optionally, the remote device is configured to receive a verification request signal further including identifier information being information indicative of the identifier associated with the operation information comprised by the verification request signal, the device being configured to include, in the verification request reply signal, identifier information indicative of the identifier associated with the verification request signal in response to which the verification request reply signal is being sent.

In an aspect of the invention there is provided method of controlling motion of a vehicle having a control system, the method comprising, by means of a remote device, communicating with a control system arranged to control, or provide input to a system to control, motion of a motor vehicle in response to a motion control signal received from the remote device, the method comprising: transmitting to the control system a remote device state signal providing information indicating in which one of a plurality of pre-defined states the remote device is currently operating, listening for a verification request signal transmitted by the control system, whereby the verification request signal comprises information that includes operation information indicative of a operation to be performed; in response to receipt of a verification request signal transmitted by the control system, performing the indicated predefined operation, the method comprising transmitting from the remote device the verification request reply signal in response to receipt of the verification request signal after performing the predefined operation, the verification request reply signal comprising information indicative of the result of the indicated predefined operation.

Optionally, the method comprises receiving, at the remote device, a verification request signal further comprising argument information for the operation to be performed, the method comprising, at the remote device, performing the predefined operation using the received argument information. Optionally, the method comprises receiving, at the remote device, a verification request signal further including identifier information being information indicative of the identifier associated with the operation information comprised by the verification request signal, the method comprising including, in the verification request reply signal, information indicative of the identifier associated with the verification request signal in response to which the verification request reply signal is being sent.

In an aspect of the present invention there is provided a control system comprising one or more controllers, the control system arranged to control, or provide input to a system to control, motion of a motor vehicle in response to a motion control signal received from a remote device, wherein the control system is arranged to perform a verification cycle in which the control system is configured to: transmit a verification request signal to the remote device; listen for a verification request reply signal transmitted from the remote device in response to the verification request signal transmitted; listen for a remote device status signal transmitted from the remote device providing remote device status information indicating in which one of a plurality of predefined states the remote device is currently operating, wherein the verification request signal comprises information that includes argument information and information indicative of a operation to be performed using the argument information, the information indicative of the operation to be performed being dependent on the remote device status information, the system being further configured to determine whether information comprised by the verification request reply signal received from the remote device includes expected operation result information being operation result information corresponding to the expected result of the operation defined by the information indicative of a operation to be performed using the argument information provided in the verification request signal, wherein the system is configured to control, or provide input to a system to control, motion of the vehicle in response to a motion control signal received from the remote device in dependence on a correspondence between the received operation result information and the expected operation result information.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
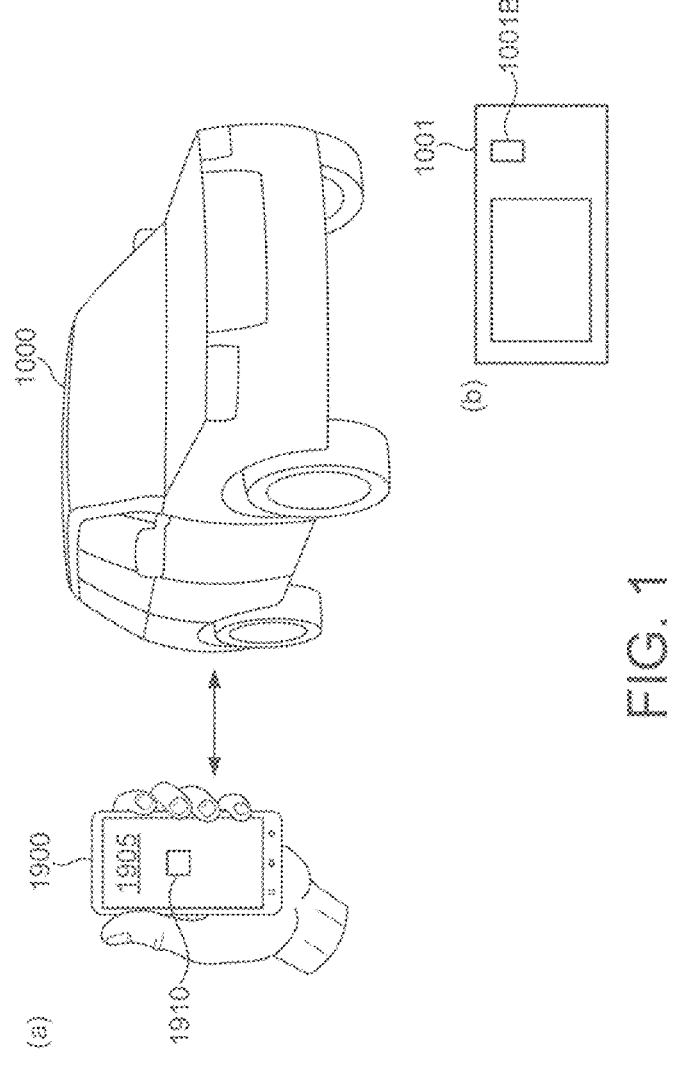
FIG. 1 is a schematic illustration of (a) a vehicle according to an embodiment of the present invention having an onboard environment perception and trajectory planning system in the form of a near field sensing system (NFS) in the present embodiment that may be controlled by a remote device in the form of a smartphone, and (b) a centre console of the vehicle.

A control system, system, vehicle and method in accordance with an embodiment of the present invention is described herein with reference to the accompanying Figures. FIG. 1(*a*) is a schematic illustration of a vehicle 1000 according to an embodiment of the present invention. The vehicle 1000 is arranged to communicate with a suitably configured remote device 1900 and to allow the remote device 1900 to control a park assist function of the vehicle 1000 whereby the vehicle 1000 may be caused, by means of the remote device 1900, to manoeuvre, at low speed. They system may be employed to manoeuvre a vehicle at low speed into a parking space. In some scenarios the system may be employed to manoeuvre a vehicle over challenging terrain such as challenging off-road terrain.

The remote device 1900 and vehicle 1000 are also configured to allow the remote device 1900 to control a remote control drive functionality whereby the user can use the remote device 1900 to control freely the vehicle's longitudinal and lateral motion, not being limited to activating a park assist function in which the vehicle 1000 executes autonomously a parking manoeuvre, although in some embodiments the remote device 1900 may be configured to allow a user to activate the park assist function and not allow the user to control motion of the vehicle freely. It is to be understood that in the present embodiment the vehicle speed is limited to 2 kph when the vehicle is executing the park assist function and 8 kph when remote control drive functionality is implemented. It is to be understood that, in some embodiments, other values of maximum speed may be employed for operation in one or both of these functions. For example, in some embodiments, vehicle speed may be limited to 10 kph when under the control of a remote device. In some alternative embodiments, vehicle speed may be limited to 15 kph when under the control of a remote device.

In the embodiment illustrated the remote device 1900 is a user's smartphone. However, it is to be understood that in some embodiments the remote device may be associated with a substantially fixed installation such as a parking facility, vehicle charging facility or other facility. The control signals may be generated by the remote device in order to guide the vehicle 1000 to park at a location appropriate for the vehicle at the facility, such as at a location at which a battery of the vehicle 1000 may be charged. In some embodiments the remove device 1900 may be a smartwatch with HMI interface including buttons and/or a touch screen enabling a user to interact with the vehicle 1000 remotely.

Figure 2:
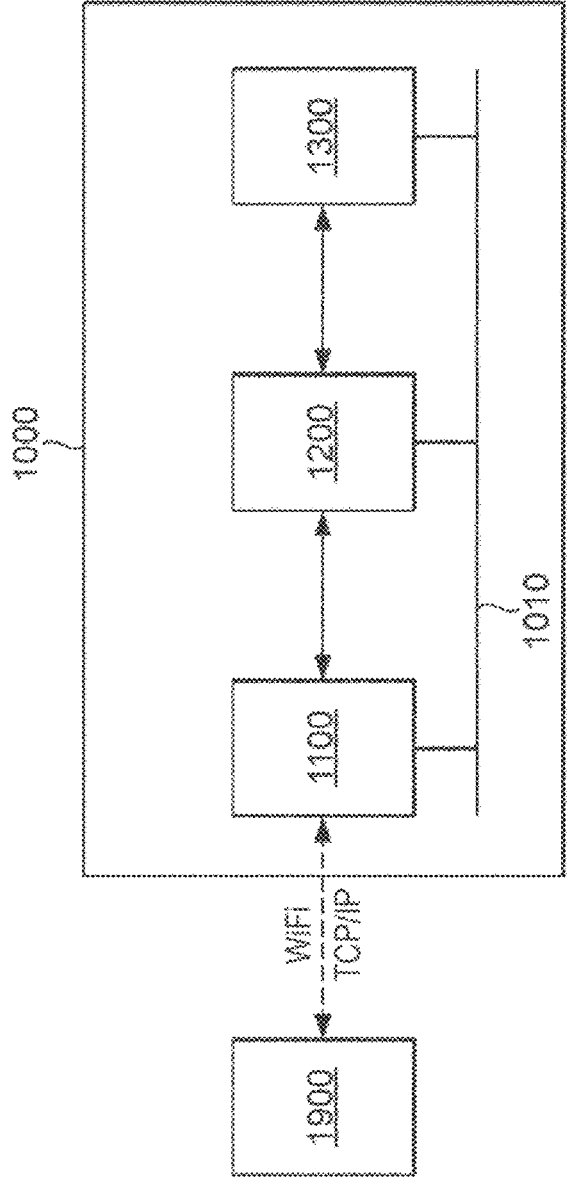
FIG. 2 is a schematic illustration of the manner in which the remote device communicates with the NFS.

FIG. 2 is a schematic illustration of the manner in which the remote device 1900 communicates with the vehicle 1000. The vehicle 1000 has a telematics control unit (TCU) 1100 (which may also be described as a vehicle domain controller (VDC)), a gateway module (GWM) 1200 and a near-field sensing system (NFS) 1300. The TCU 1100 provides an interface between the remote device 1900 and a vehicle controller area network (CAN) bus 1010 to which the GWM 1200 and NFS 1300 are also connected. In the present embodiment, the CAN bus 1010 employs ethernet networking technology (IEEE 802.3) to facilitate communications between connected systems. However, it is to be understood that the present invention is not limited to ethernet technology and any suitable networking technology may be employed. It is to be understood that, in some embodiments, the remote device 1900 may communicate directly with the NFS 1300 rather than via the GWM 1200. The remote device 1900 is configured to establish a wireless communications link or 'connection' between the remote device and TCU 1100 by means of a short-range wireless communications protocol. In the present embodiment the remote device 1900 is configured to establish a wireless communications link using a 'wi-fi' protocol, however other protocols may be used in addition or instead such as Bluetooth®. As noted above is to be understood that the remote device 1900 may be any suitable device such as a smartphone, smartwatch, a tablet computer or any other suitable programmed computing device. The remote device 1900 has a remote vehicle control (RVC) software program or application installed. When the RVC app is running, the program enables a user of the remote device 1900 to control movement of the vehicle using the remote device 1900. In the present embodiment, the RVC program permits the user to activate a park assist (PA) function of the vehicle remotely. The PA function is implemented by the NFS 1300. The NFS 1300 is provided with remote park assist (RPA) functionality, permitting the NFS 1300 to receive commands in respect of the PA function from the remote device 1900.

In the present embodiment, the PA function may be activated by a user when driving the vehicle 1000 by means of a PA function activation button 1001B provide on a centre console 1001 of the vehicle 1000 (FIG. 1(*b*)). When the PA function is activated, the NFS 1300 is configured automatically to execute a parallel parking manoeuvre in which the vehicle NFS 1300 identifies a suitable parking space as the vehicle travels along a road, and then determines a desired path of travel for the vehicle 1000 in order to park the vehicle in that space. That is, the NFS 1300 controls a speed and steering angle of the vehicle 1000 in order to parallel park the vehicle 1000. The NFS 1300 determines the proximity of other objects to the vehicle 100 by means of sensors comprised by the vehicle 1000. It is to be understood that other parking manoeuvres may be performed in some embodiments in addition or instead, such as perpendicular parking, garage parking (whereby a vehicle is caused to move into a garage), or nudge parking (in which a vehicle is caused to move incrementally forward or backward in order to position the vehicle correctly at a desired location).

By pressing a button 1910 on the remote device 1900, the RPA function may be activated. In the illustrated embodiment the remote device 1900 is a smartphone having a touchscreen 1905. The button 1910 is provided in the form of an icon displayed on the touchscreen 1905. In some alternative embodiments the remote device may be provided with a physical button instead. In some embodiments, the remote device 1900 may be configured to detect dynamic gestures by means of the touchscreen, such as swiping, for example sliding a user's finger in a particular direction. In some embodiments a slide and hold gesture may be required to be performed in order to avoid accidental activation of a feature. For example, a user may be required to touch a particular location on a touchscreen and slide their finger in a particular direction to a given location and then hold their finger in that location in order to activate a feature, such as causing forward or reverse movement of the vehicle, optionally forward or reverse movement in a particular direction. In some embodiments a direction of steer of the vehicle may be controlled based on a direction in which a user slides their finger. Other arrangements may be useful in some embodiments.

As shown in FIG. 2, in the present embodiment, when the vehicle 1000 receives a signal from the remote device 1900 it is configured to communicate information received from the remote device 1900 to the GWM 1200 via the CAN bus 1010. The GWM 1200 in turn communicates the received information to the NFS 1300 via the CAN bus 1010. In the present embodiment, the User Datagram Protocol (UDP) communications protocol is employed for communications between the TCU 100 and the GWM 1200, and between the GWM 1200 and the NFS 1300. It is to be understood that any suitable automotive communications protocol may be employed over the wired network instead of or in addition to a CAN bus, such as FlexRay, Ethernet, Local Interconnect Network (LIN) or any other suitable protocol. It is to be understood that, in the present embodiment, communication between the remote device 1900 and vehicle 1000 employs a cyclic redundancy check (CRC) methodology to detect communication errors. However, embodiments of the present invention implement a more sophisticated communications integrity verification methodology that is more appropriate to the control of vehicle movement by means of a consumer grade computing device such as a smartphone, the integrity and correct operation of which a manufacturer of the vehicle 1000 may have little or no control over. Thus, the NFS 1300 is configured to verify the correct operation of the remote device 1900 in order to ensure correct control of movement of the vehicle 1000.

Figure 3:
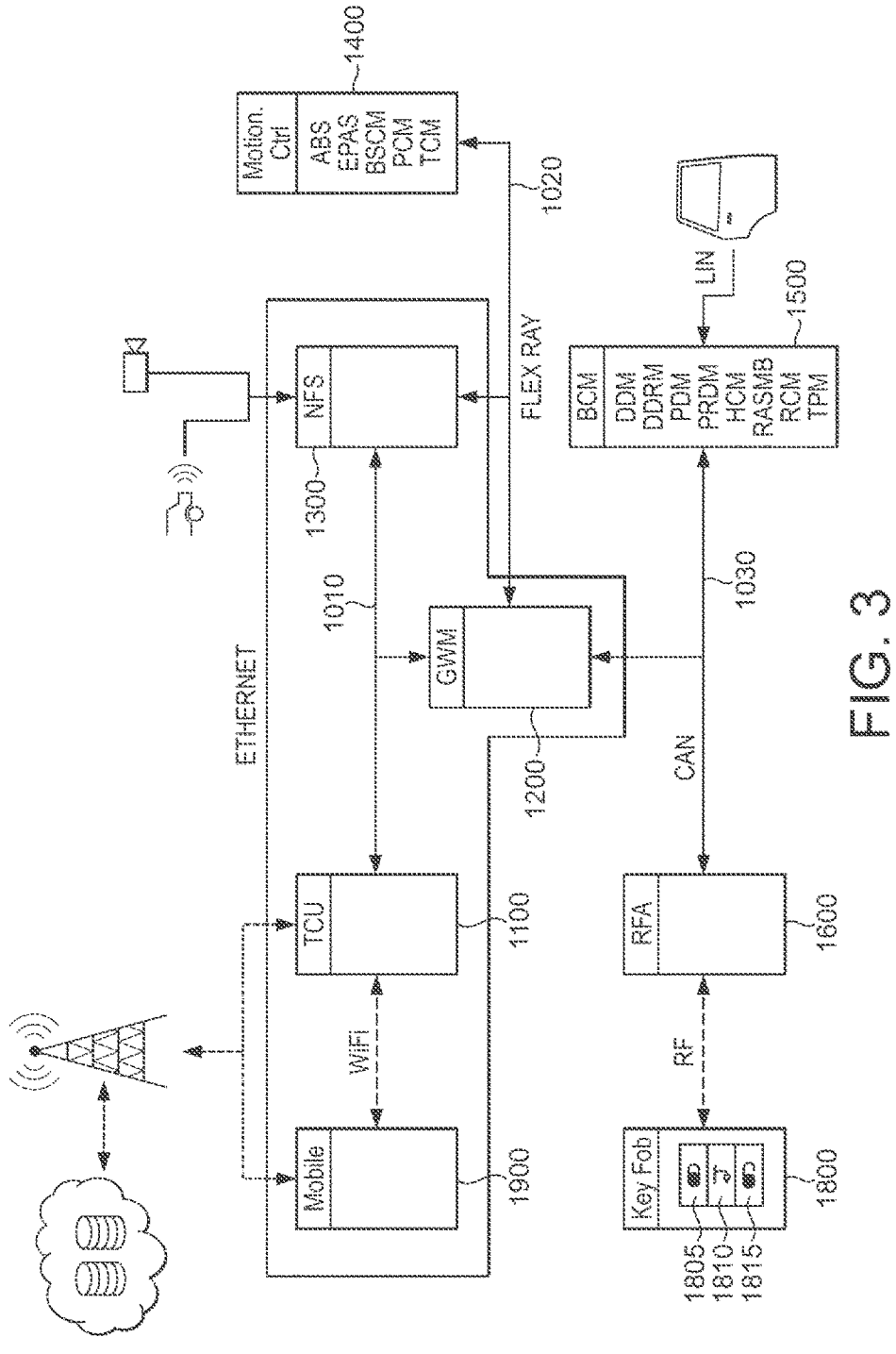
FIG. 3 is a schematic illustration of the manner in which further vehicle components communicate with one another.

FIG. 3 illustrates the manner in which further vehicle components communicate with one another in the present embodiment. As shown in FIG. 3, the NFS 1300 is also in communication with the GWM 1200 and in addition a motion control unit (MCU) 1400 via a separate motion control communications bus 1020. The motion control communications bus 1020 permits independent communication between each of the GWM 1200, NFS 1300 and MCU 1400. The motion control unit 1400 is configured to communicate with a vehicle anti-lock braking system (ABS), electronic park assist system (EPAS), Brake System Control Module (BSCM), powertrain control module (PCM) and Transmission Control Module (TCM). The GWM 1200 is also in communication with a remote fob module (RFA) 1600 and a body control module (BCM) 1500 by means of a BCM communications bus 1030. The RFA 1600 is configured to communicate with a remote key fob 1800 carried by a user. The remote fob 1800 is provided with a wireless radio frequency communications capability. The RFA 1600 is configured periodically to attempt to communicate wirelessly with the remote fob 1800 in order to determine whether the remote fob 1800 is within range of communication with the RFA 1600. If the RFA 1600 determines that the remote fob 1800 is within range of communication with the RFA 1600, the RFA 1600 informs the GWM 1200 via the BCM communications bus 1030 such that the GWM 1200 is aware, at a given moment in time, whether the remote fob 1800 is within range of communication with the RFA 1600. It is to be understood that the GWM 1200 is configured to prevent certain vehicle functions from being activated, such as movement of the vehicle (by preventing powertrain operation) and a vehicle infotainment system unless the remote fob 1800 is within range of communication with the RFA 1600. Thus, the motion control unit 1400 is configured to require an indication from the GWM 1200 that powertrain operation is allowed before it can allow powertrain operation. The remote fob 1800 is provided with three user-operable controls—a master lock control button 1805, a boot (or 'trunk') unlock button 1810 and a master unlock button 1815. In response to pressing of one of the buttons 1805, 1810, 1815 the remote fob 1800 transmits a radio signal to the RFA 1600 indicative of the identity of the button pressed. The RFA 1600 in turn transmits a signal to the BCM 1500 indicative of the identity of the button pressed. If the user has pressed the master lock button 1805, the BCM 1500 causes all door locks and a boot lock of the vehicle 100 to lock. If the user has pressed the boot unlock button 1810, the BCM 1500 causes a boot lock only of the vehicle 100 to open. If the user has pressed the master unlock button 1815, the BCM 1500 causes all door locks and a boot lock of the vehicle 100 to open.

As shown in FIG. 2, the NFS 1300 is configured to communicate with the remote device 1900 via the GWM 1200 and TCU 1100. It is to be understood that embodiments of the present invention are configured to perform a verification cycle to check that a communications link between the remote device 1900 and NFS 1300 is functioning correctly, and furthermore that the remote device 1900 is functioning correctly. In order to accomplish this, the NFS 1300 is configured to transmit a verification request signal to the remote device 1900 via the GWM 1200 and TCU 1100 and to listen for a verification request reply signal transmitted by the remote device 1900 back to the NFS 1300 via the TCU 110 and GWM 1200 in response to receipt of the verification request signal. It is to be understood that, in the present embodiment, the verification request signals and verification request reply signals are in addition to signals transmitted between the remote device 1900 and NFS 1300 for controlling the vehicle 100. These signals also include a remote device state signal transmitted from the remote device 1900 to the NFS 1300, being a signal comprising remote device state information indicative of the state of the remote device. The state signal is dependent on the vehicle control function selected by the user and the stage of control. In the present embodiment, the remote device 1900 is configured to display a different GUI screen for each of the different vehicle control functions. In the present embodiment, each GUI screen is assigned a number, in the present embodiment a number in the range from 1 to 6. The number is indicative of the nature of the operations that the remote device 1900 is required to perform when the control function corresponding to a given GUI screen is selected by a user. In the present embodiment, there are six device states:

1. A connection approved state into which the device 1900 is placed following the establishment of a connection with the NFS 1300;
2. A manoeuvre selection state in which the device 1900 invites a user to select the desired manoeuvre to be performed;
3. A manoeuvre confirmation state in which the device 1900 invites a user to confirm the desired manoeuvre to be performed;
4. A manoeuvre interrupted state assumed by the device 1900 when the device 1900 is unable to allow a manoeuvre to continue;
5. A manoeuvring ('motion in progress') state assumed by the device 1900 when the vehicle is manoeuvring in response to one or more control signals generated by the device 1900; and
6. A nudge mode in which the device 1900 causes the vehicle 1000 to move in incremental steps of predetermine distance in a forward or reverse direction in response to a user input.

In the present embodiment, the NFS 1300 is configured to allow the user to cause the NFS 1300 to perform the following manoeuvre functions:

a) activate the PA function in which the NFS 1300 causes the vehicle 1000 to execute an automatic parking manoeuvre;

b) cause the vehicle to be operated in the nudge mode of operation in which, as noted above, the NFS 1300 causes the vehicle to move forward or backward in short increments of a predetermined distance such as 10 cm, 20 cm, 30 cm, 50 cm or any other suitable predetermined distance according to a value previously stored;

c) cause the vehicle to be operate in a free control mode of operation in which the NFS 1300 allows the user to control a direction of movement of the vehicle 1000 (forward or backwards), a steering angle of the vehicle 1000 and a speed of movement of the vehicle 1000. It is to be understood that the remote device 1900 is configured to allow a user to select one of the above functions via the GUI and to cause the NFS 1300 to implement the selected function. The remote device 1900 transmits to the NFS 1300 the state signal associated with the GUI screen that the remote device 1900 is displaying at a given moment in time.

FIG. 4(*a*)-(*d*) illustrates four different GUI screens that the remote device 1900 is configured to display in dependence on user selection. FIG. 4(*a*) shows a GUI screen associated with the nudge mode of operation (state 6) in which a user can cause the vehicle to move forward, in the present embodiment in increments of 20 cm, each time the user presses the 'perform nudge' button A. Instructions in respect of the function are provided in a text box B. The user can select forward or reverse motion of the vehicle by selecting the forward direction button C or reverse direction button D. FIG. 4(*b*) shows a GUI screen associated with the part assist (PA) function. Once the PA function has been selected in state 2, the remote device 1900 assumes state 4 and the GUI screen shown in FIG. 4(*b*) is displayed. In order to cause the PA function to commence and continue, a user must continually move their finger in a clockwise direction around a periphery of a region defined by an image displayed in a lower region of the screen, in the present example a vehicle manufacturer's logo. If the user wishes to cancel the PA function, the user may press the Cancel button B. Once a user has moved their finger clockwise around the logo image, the remote device 1900 assumes state 5 (FIG. 4(*c*)) and the manoeuvre is commenced. Provided a user continues to move their finger around the logo image in a clockwise direction, as indicated in FIG. 4(*c*), the NFS 1300 causes the PA function to be executed. A horizontal progress bar is presented above a graphical indication of the vehicle and indicates an extent to which the manoeuvre has been completed. The horizontal bar changes colour progressively from left to right in the example shown, such that when the bar has fully changed colour, the parking manoeuvre executed by the PA function is complete. If the user stops moving their finger around the logo image before the manoeuvre is complete, the remote device 1900 assumes state 4 (manoeuvre interrupted) and the NFS 1300 causes vehicle movement to terminate. FIG. 4(*d*) illustrates a screen displayed when the remote device 1900 is in state 5 and causing the vehicle 1000 to operate in the free control mode of operation. In this mode, the remote device 1900 displays an image V of the vehicle 1000 in a lower portion of the screen; when the screen is initially displayed, a dot A is superimposed on the vehicle image V. A speed of travel of the vehicle is displayed to the left of the image V. To the right of the image V are provided buttons B, C permitting a user to select motion of the vehicle 1000 in a forward (button B) or reverse (button C) direction. Along a left edge D of the screen, a linear speed scale is provided, the scale spanning the range from 0 to 4 kph in the example shown. Other forms of speed scale, including non-linear speed scales, may be used in some embodiments. Other ranges of speed may be provided.

As noted above, when the screen is displayed initially, the dot A is superimposed on the vehicle image V, indicating that the vehicle is stationary. It is to be understood that, in the present embodiment, control of a vehicle 1000 by means of the remote device 1900 may only be initiated when the vehicle 1000 is at rest. In order to cause the material to move in a forward or reverse direction, a user selects the direction of travel by means of buttons B, C and then drags the dot A upwards on the screen. It is to be understood that moving the dot upwards along x-axis X causes the vehicle 1000 to accelerate to a speed corresponding to the distance the dot is moved in the direction of increasing speed along the speed scale. A direction of travel is controlled by moving the dot left or right of the x-axis X, i.e. in a y-direction parallel to the Y axis. Thus, dragging dot A to position E will cause the vehicle 1000 to accelerate to a speed of around 2.25 kph. Dragging the dot to position G, to the right of the x-axis X, will cause the vehicle steering angle to change to an angle around 10 degrees to the right, causing the vehicle 1000 to follow a trajectory that veers to the right. In some embodiments, the remote device 1900 may display a predicted trajectory of vehicle travel on the GUI, as shown at F and H for dot positions E and G respectively.

It is to be understood that, when the remote device 1900 is in state 5 (manoeuvring in progress), the remote device 1900 is configured to output to the NFS 1300 data indicative of a position of a user's finger on the screen of the remote device 1900 at a given moment in time. In some embodiments, the remote device 1900 may also output data indicative of a speed and direction of movement of the user's finger at a given moment in time. Accordingly, the remote device 1900 may be required to perform relatively complex operations (which may, for example, comprise one or more calculations such as division or multiplication) compared with a state in which the remote device 1900 merely indicates when a particular button has been pressed, such as when selecting the desired vehicle control function (state 2) and confirming selection of a given control function (state 3).

Accordingly, in order to ensure that the remote device 1900 is operating correctly, and able correctly to perform operations demanded of it by the RVC software program, the NFS 1300 is configured to cause the remote device 1900 to perform an operation the complexity of which is dependent on the remote device state signal. The NFS 1300 then verifies that the operation has been performed successfully. If the NFS 1300 determines that the remote device 1900 is not functioning correctly, it is configured to terminate the control of vehicle motion by the remote device 1900 as explained later below.

FIG. 4(*e*) illustrates a process 400 as an operation of the NFS 1300 and remote device 1900 in further detail. The NFS 1300 is configured to provide, in computer program code, a challenge generator function 1320, a random number generator function 1325 and a response validator function 1340.

The random number generator function 1325 generates three successive random numbers (or pseudo-random numbers) and provides the generated numbers to the challenge generator function 1320. The challenge generator function 1320 then determines which predefined operations are permitted to be the basis for a challenge to the remote device 1900, based on the remote device state signal, and selects one of the predefined operations. In the present embodiment, the challenge generator function 1320 uses one of the random numbers generated by the random number generator function 1325 to select the predefined operation from a group of available operations for the current remote device state. FIG. 4(*f*) is a table listing the 16 predefined operations from which the challenge generator function 1320 may select, in the present embodiment. Other embodiments may employ fewer or more predetermined operations. The first column of the table lists the operation index number, Op_Idx, by which each operation may be uniquely identified by the challenge generator function 1320 and remote device 1900. The second column lists the remote device state numbers, 1 to 6 (listed above), applicable to that operation.

By way of example, if the remote device 1900 is in state 6 and displaying (for example) the GUI screen of FIG. 4(*a*) allowing a user to cause the vehicle 1000 to nudge forward or backward, the challenge generator function sets a flag OperationAllowed in respect of each of the predetermined operations to indicate whether they are available. The challenge generator function 1320 then employs the first random number generated by the random number generator to select one of the allowed operations. In some embodiments the first random number N generated by the random number generator is in the range from 1 to the number of allowed operations for the current device state, in the present example 7, and the challenge generator selects the Nth allowed operation in the table of FIG. 4(*f*). Other ways of selecting a predetermined operation may be useful in some embodiments. The Op_Idx value of the selected operation may be referred to as operation information since it is indicative of the operation to be performed by the remote device 1900 in order to verify correct functioning or operation of the remote device 1900.

The challenge generator function 1320 then performs the selected predefined operation using the two remaining random numbers provided by the random number generator function 1325 as the arguments and stores a result of the predefined operation in a non-volatile memory (NVM) 1335 of the NFS 1300. The two numbers used as the arguments for an operation may be referred to as argument information for the operation. It is to be understood that other types of memory may be used in addition or instead, such as volatile memory (VM). VM may have the advantage that it may be written to and/or read from at a faster speed than NVM in some embodiments. In the present embodiment, each operation requires two arguments. However, other operations may be employed requiring only one argument in some embodiments. In some embodiments, operations may be performed using more than two arguments.

By way of example, the two random numbers may form two arguments (Part 1 and Part 2) of an operation performed by the challenge generator function 1320. In the present embodiment, the parts are 8-bit unsigned. This has the advantage that the operation may be performed on any computing device having an 8-bit architecture or higher. It is to be understood that the operations from which the challenge generator function 1320 selects are each arranged to use unsigned bits and avoid generation of overflows. One example operation is as follows:

$$\text{Response} = (((Part1 * Part2) >> (Part1 \&\& 0x0F) + (Part1 \char`\^ Part1) << (Part2 - Part1))/(0x03))$$

where the parameter 'Response' is the result of the operation, and therefore the response to be expected from the remote device 1900 when it performs the same operation, '>>' refers to a right bit shift operation, '<<' refers to a left bit shift operation and 'A' is an exclusive OR (XOR) operation. It is to be understood that the above operation utilises a number of different operations that a central processing unit (CPU) of the remote device 1900 is to be expected to perform reliably. Thus, following the multiplication operation, in which Part 1 and Part 2 are multiplied together, the result is right shifted so the data returns to the 8-bit range. It is to be understood that '0x03' is shorthand for '000003' which represents the quantity '3'. The final step of division by 3 is intended to avoid division by a very large number which can result in a very low numerical result, which may show as a '000000' result. Such a result would not meet the criteria for the result to be considered valid.

It is to be understood that by using unsigned bits in the operation, a negative number cannot be generated as a result of an operation. This feature increases the compatibility of the operation with a range of different computer system architectures, some of which may not support negative numbers. It is to be understood that the operations available to the challenge generator function 1320 result in a deterministic output that is independent of the programming language and compilers used, and therefore provides more flexibility for remote device development. More generally, equations that satisfy the following conditions are advantageous:

(1) It does not rely on signed arithmetic and representation of signed numbers;

(2) It protects against division by zero; and (3) it utilizes all basic operation of generic central processing units (arithmetic, logical, bitwise) to give more confidence in respect of the operating condition of the remote device, which may employ consumer grade electronics as opposed to the higher-grade electronics employed in motor vehicle onboard control systems.

A local timer function 1330 provided by the NFS 1300 provides local time information to the challenge generator 1320. The NFS 1300 stores the result of the selected operation (the expected 'Response' or 'expected operation result information') using a given argument generated by the random number generator function 1325, the identity of the selected operation, Op_Idx, being uniquely indicative of the selected operation as noted above, and also the local time information provided by the local timer function 1330 when the result of the operation is stored in the NVM 1335. In the present embodiment, the NFS 1300 is also configured to store an index value Idx together with each stored value of (a) operation result ('Expected Response') and operation identity Op_Idx, and (b) corresponding local time information. In the present embodiment, the index value Idx is incremented by a predetermined amount for each successive operation result. It is to be understood that this local time stamp will be used later to detect communication problems (slow response, no response). The local time stamp is employed in order to avoid a requirement to employ common clock/time information between the remote device 1900 and the onboard electronic control unit (ECU) of the NFS 1300. This reduces the amount of network data exchange and eliminates the problem of synchronizing the clocks between the remote device 1900 and NFS 1300. It is to be understood that the index Idx may be used to detect sequencing errors and helps in accessing stored data more quickly as described below.

Once the result of the selected predefined operation has been generated, the NFS 1300 is configured to transmit to the remote device 1900 the verification request signal which includes (a) the index value Idx, (b) argument information, in the present embodiment the argument information being the arguments used for the operation (Part 1, and Part 2) and (c) operation information in the form of the identity of the selected operation, Op_Idx, that the remote device 1900 is required to perform using the argument information. In some embodiments the index value Idx may be omitted and the local time information used as an index or identifier of the operation identity Op_Idx and argument information transmitted. It is to be understood that an advantageous feature of the present embodiment is that local time is not required to be, and is not, transmitted to the remote device 1900 from the NFS 1300. The NFS 1300, acting as challenger, manages time itself and does not require synchronisation with the remote device 1900. This feature helps the NFS 1300 to compensate for internal clock jitters and different ways of storing local time stamp information, avoiding the need for synchronization of time between two devices (in this case, the NFS 1300 and remote device 1900).

Figures 4A, 4B, 4C:
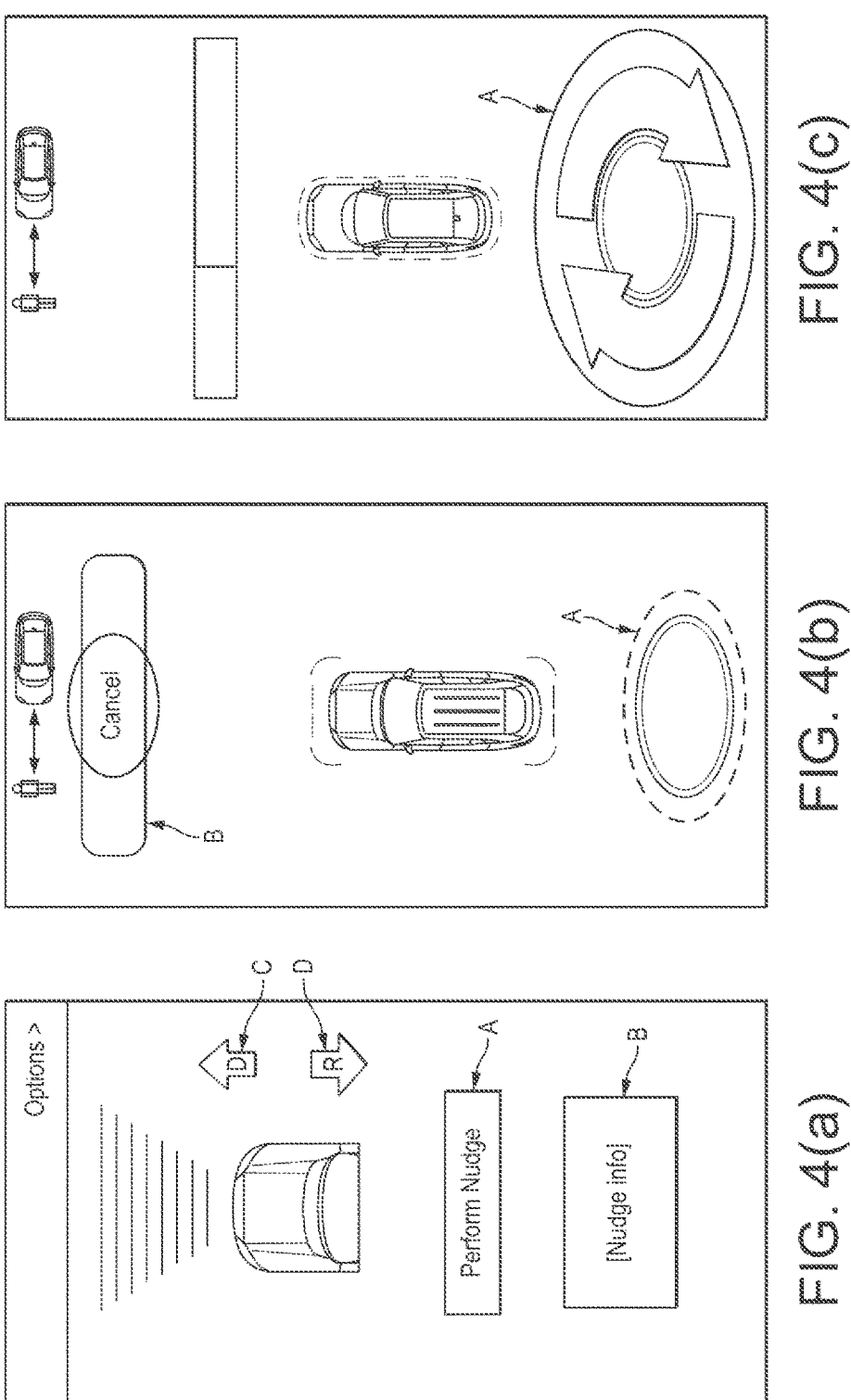
FIG. 4 shows (a) a remote device GUI for vehicle control in a nudge mode, (b) the GUI for vehicle control when awaiting user confirmation to initiate control in the park assist mode, (c) the GUI during vehicle manoeuvring in the park assist mode, (d) the GUI for vehicle control during manoeuvring in the free control mode of operation, (e) operation of the NFS and remote device 1900 in further detail, (f) a table listing the 16 predefined operations from which a challenge generator function may select, and (g) a schematic illustration of the manner in which an operation for execution by the remote device is selected by the NFS in an embodiment of the pre sent invention.
Figure 4D:
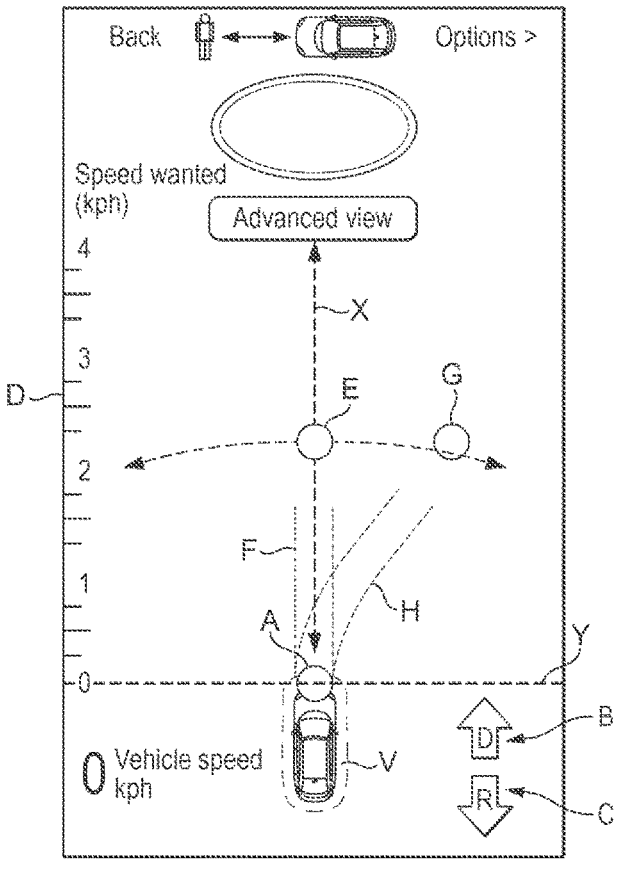
Figure 4E:
Figure 4E:
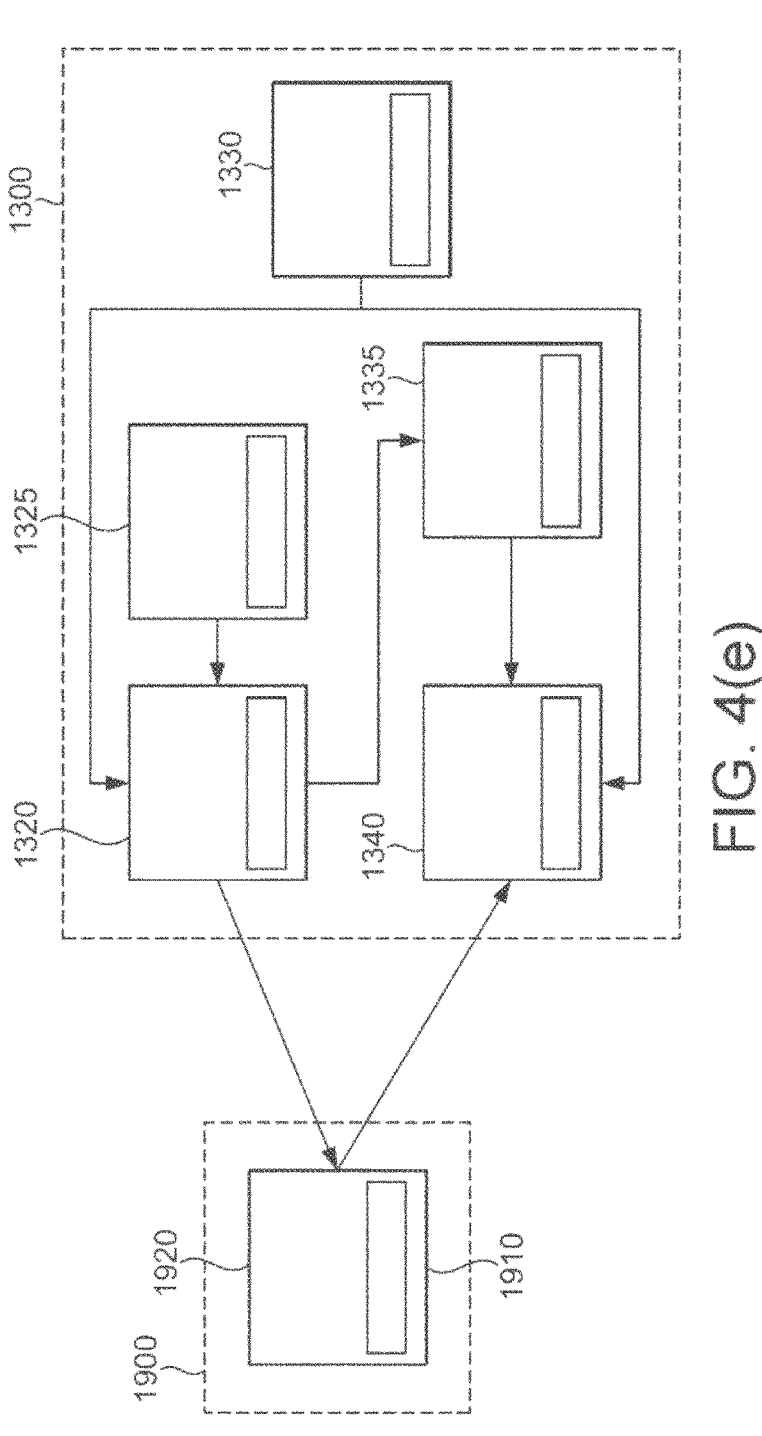
Figure 4G:
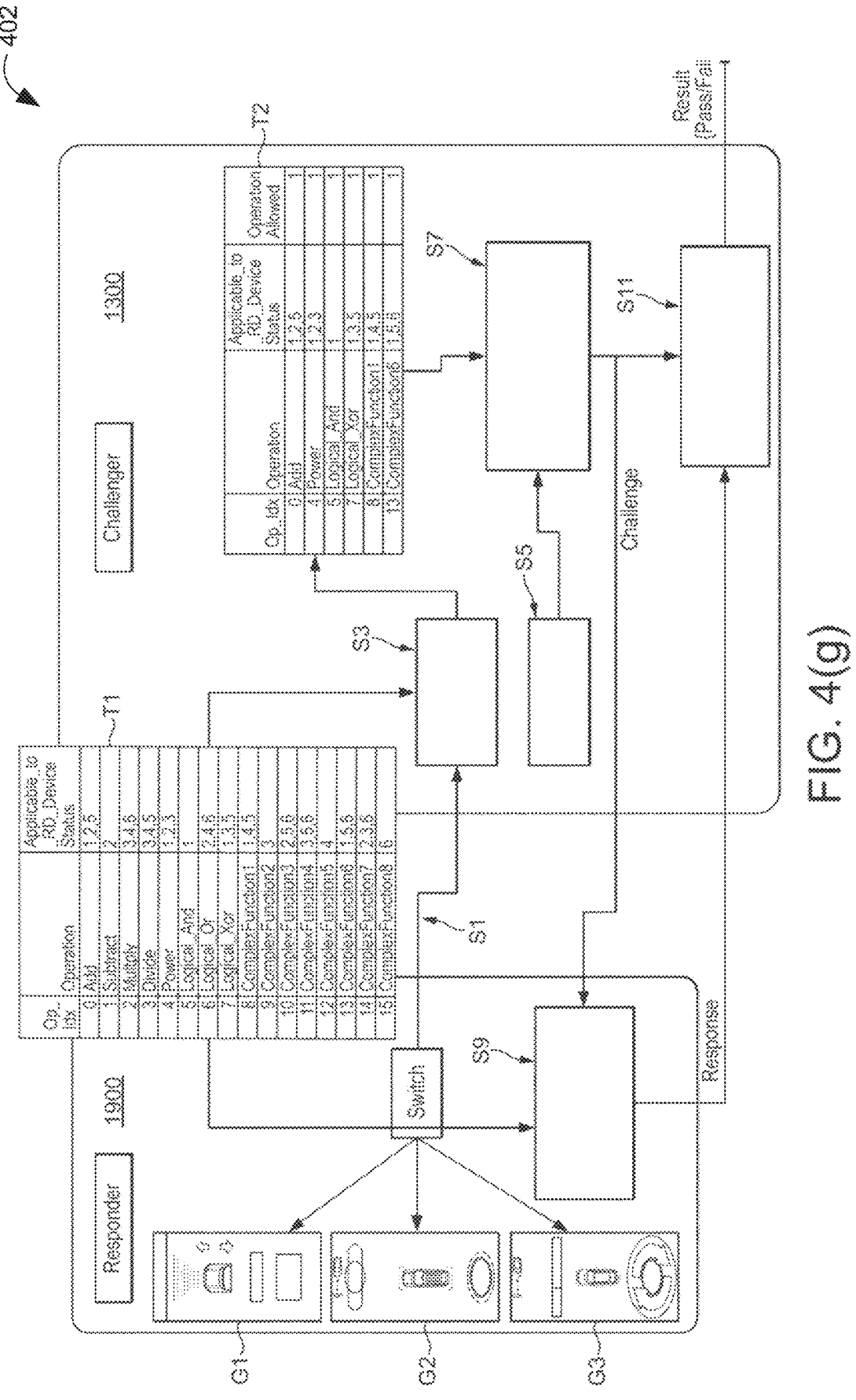

FIG. 4(g) a schematic illustration of a process 402 of the manner in which an operation for execution by the remote device 1900 is selected by the NFS 1300. At step S1, the remote device 1900, acting as responder, transmits to the NFS 1300, acting as responder, a signal indicating the state of the remote device 1900. In the present embodiment the signal is dependent upon the GUI screen being displayed by the remote device. Three possible GUI screens G1, G2, G3 are illustrated in FIG. 4(g). It is to be understood that other screens may be displayed in the present embodiment. At step S3 the NFS 1300 determines which operations are allowable for the current state of the remote device 1900 based on the received signal by reference to stored information that is displayed in table T1 of FIG. 4(g). The third (right-hand) column of table T1 illustrates the states that are allowable for a given one of the 16 operations listed in the second column of table T1. The index value Op_Idx of each operation is listed in the first (left-hand) column.

In the example illustrated in FIG. 4(g), the remote device 1900 is in the 'connection approved' state, state 1 listed above. The allowed operations for state 1 are shown, by way of illustration, in table T2. As can be seen, there are 6 allowed operations for state 1. At step S5 the random number generator generates three random numbers. The first is a random number N in the range from 1 to 6 (since there are 6 allowed operations). At step S7 the challenge generator 1320 selects the Nth operation from the list of allowed operations in the order present in table T1 (and as summarised in table T2) and calculates a result of the Nth operation using the second and third random numbers as arguments. At step S9 the NFS 1300 transmits to the remote device 1900 the following information:

1. The index value Idx for the challenge/transmission (described above and in further detail below);
2. The identity of the operation that the remote device 1900 is required to perform, Op_Idx; and
3. The argument to be used in the operation, being the second and third random numbers generated by the random number generator 1325 (other quantities of random numbers may be useful, such as 1, 3, 5, 7, 10 or any other suitable quantity).

The remote device 1900 then performs the required operation by determining the required operation by reference to the received value of Op_Idx and stored data the content of which is illustrated in table T1, the stored data providing the operation associated with the received value of Op_Idx. The remote device 1900 uses the received argument information for the operation. The remote device 1900 then transmits back to the NFS 1300 the received index value Idx and the result of the operation using the received argument information. At step S11 the NFS 1300 checks whether the received result of the operation using the argument information transmitted corresponds to the stored value of operation result information (i.e. the stored value of expected operation result information) associated with the index value Idx of the received information from the remote device 1900. The result of the check performed by the NFS 1300 is a determination either that the received result does correspond (i.e. that the remote device 1900 has 'passed' the challenge set by the NFS 1300) or that the received result does not correspond (i.e. that the remote device 1900 has 'failed' the challenge set by the NFS 1300).

Figure 5:
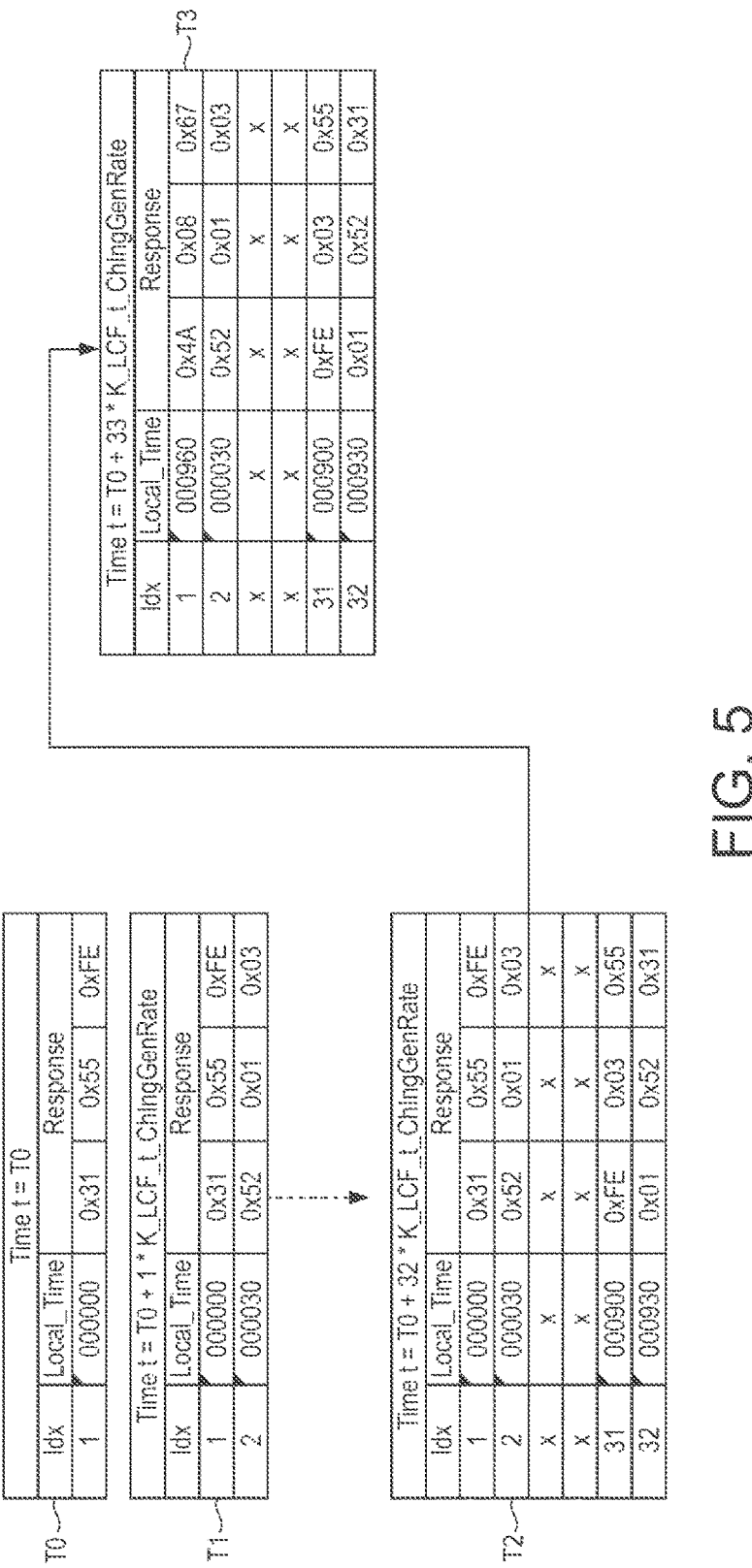
FIG. 5 illustrates the accumulation in non-volatile memory (NVM) of values of index, local time information and operation result information.

FIG. 5 illustrates the accumulation in the NVM 1335 of stored values of index Idx, local time information, operation result information and Op_Idx. Block T0 is a schematic illustration of the content of the NVM 1335 at time t=T0. As shown, the NVM 1335 has stored therein data associated with a single index value. The stored data is in the form of the index value (Idx) which in this example is '1', a local time value which in this example is '000000', and operation result information in the form of three stored values, which in this example are '0x31' (an abbreviation of '000031'), '0x55' and '0xFE'. The Op_Idx value indicates that the remote device 1900 is in state 6 (and remains so throughout the example of FIG. 5).

Block T1 shows the content of the NVM 1335 at time t=T1, once data corresponding to each of two index values have been stored. As can be seen from the data, the time lapse between operations using successive argument information was 30 ms. Other values of time lapse may be useful in some embodiments. Block T2 shows the content of the NVM 1335 at time t=T2, once 32 index values with corresponding local time and operation result information has been stored. As can be seen from block T3, which illustrates the content of the NVM 1335 at a time t=T3 of 30 ms after time T2, the subsequent index value after the $32^{nd}$ index value reverts to '1' and the local time data and operation result information overwrites the previous such data corresponding to the same index value. Thus, the NFS 1300 implements a circular buffer methodology in respect of the storing of data in the NVM 1335. It is to be understood that employing a circular buffer helps to reduce the memory usage and automatically purges old stored values by overwriting with new values more frequently. This makes the algorithm faster and the system will discard responses which come after too much time has elapsed (relatively old messages). This reduces the risk of a replay attack (or playback attack) on the system. By replay attack is meant a situation in which data transmitted by the remote device 1900 to control the vehicle 1000 is fraudulently repeated or delayed by a third party. It is to be understood that other values of number of index values may be stored before rollover occurs, depending on the actual protocols, electrical architecture and system need. The larger the value, the more memory required to implement the method. However, too small a value will result in more frequent rollover and may cause the system to be overly sensitive to electrical and/or electromagnetic noise.

Figure 6:
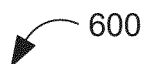
FIG. 6 is a flow diagram illustrating operation of the NFS.
Figure 6:
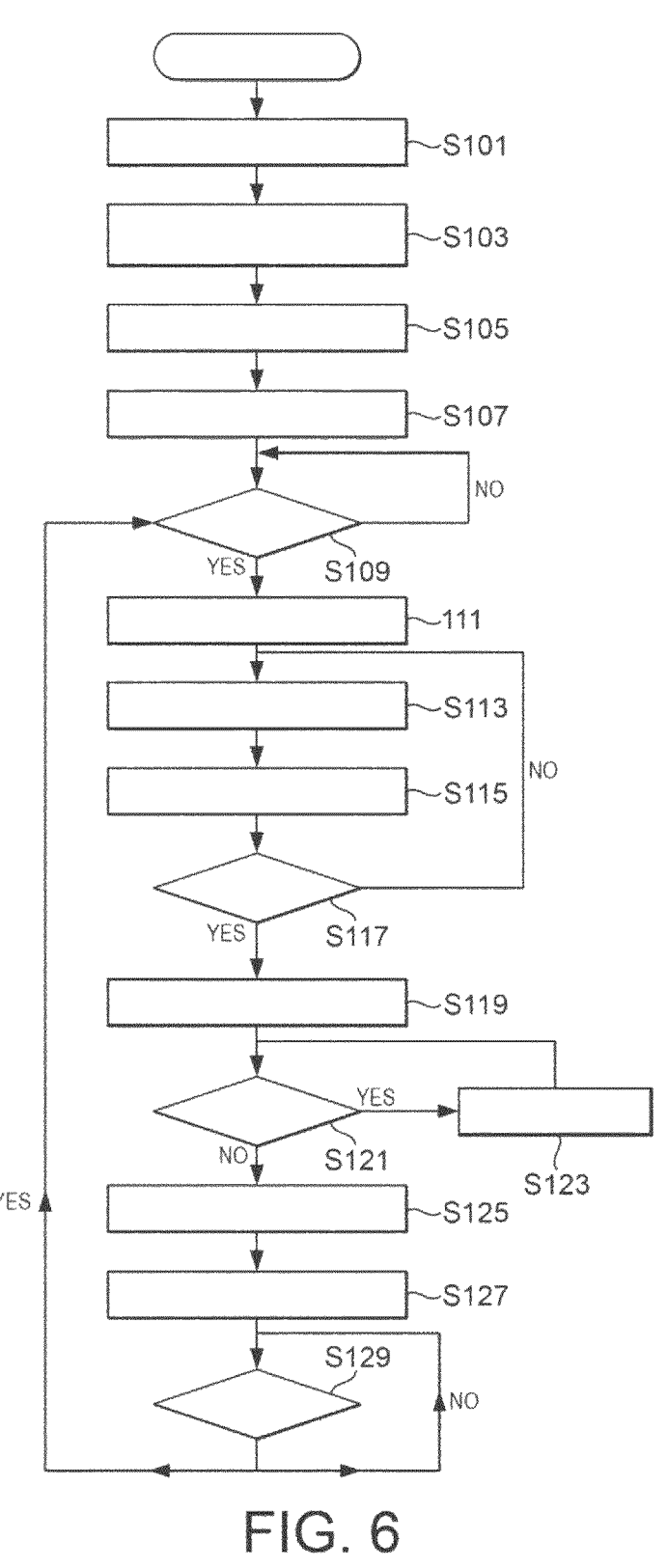

FIG. 6 is a flow diagram 600 illustrating the operation of the NFS 1300, acting as challenger, in further detail. At step S101 the NFS 1300 initializes the local timer function 1330 by setting an initial value of time information associated with the local timer function 1330 to a predetermined base timer value (such as zero). It is to be understood that initialization may also be referred to as 'resetting' the timer function 1330. The local timer function 1330 begins timing from the base timer value. At step S103 the random number generator function 1325 is also initialized (or 'reset'). It is to be understood that the random number generator function may be provided in the form of a hardware-based true random number generator or a software-based pseudo-random number generator requiring a "seed" value to initialize the software. The initialization or reset of the random number generator function generally happens after a saturation period (where the random numbers start repeating) or at each power cycle. In the present embodiment the random number generator function 1325 is implemented in software. At step S105, 'old' data stored in the NVM 1335 is cleared. In some embodiments this is performed by setting all stored values to a predetermined value, such as zero. Thus, in the present embodiment, stored values corresponding to (a) index values, (b) values of the results of operations and (c) local time information associated with the operations are set to a predetermined value such as '0'. At step S107 a current value of index, i.e. a current index value is reset to a base or starting value. In the present embodiment the base value is '1'. At step S109 the NFS 1300 checks whether a remote device 1900 has established a communications connection with the TCU 1100. If the remote device 1900 has not established a connection, the NFS 1300 repeats step S109. That is, the NFS 1300 does not generate any challenges by means of the challenge generator 1320 until a remote device 1900 successfully connects to the vehicle 1000. If the remote device 1900 has established a connection, then at step 111 the NFS 1300 starts a periodic timer function by storing a periodic timer start value, being the current value of time information being output by the local timer function 1330, in a memory of the NFS 1300. In the present embodiment, the periodic timer start value is stored in the NVM 1335. Other ways of implementing a periodic timer function may be useful in some embodiments.

At step S113 a random challenge is generated. The challenge generator 1320 generates a challenge, in the form of an operation that is to be performed by the remote device 1900, in the manner described above (see e.g. FIG. 4(g)). At step S115 the challenge generator 1320 performs the predefined operation described above. At step S117 the challenge generator 1320 determines whether the result of the operation meets certain predefined criteria in order to be considered valid. If the result does not meet the criteria, it is considered invalid and the method continues at step S113. If the result does meet the criteria it is considered valid and the method continues at step S119.

In the present embodiment, in order for the result of the operation to be considered valid, the memory data bits representing the result must not all be logical '1' or all logical '0'. It is to be understood that one or more other criteria or conditions may be useful in addition or instead. The feature that the challenge generator 1320 performs the predefined operation has the advantage that the challenge generator 1320 is able to verify that the result of the challenge meets the predefined criteria before the challenge is transmitted to the remote device 1900. It is to be understood that if a result of the predefined operation is that all the memory bits are logical '1' or logical '0', the NFS 1300 may not be able to distinguish this from a corrupted response from the remote device 1900 in which all the bits are set to logical '1' or '0'. Furthermore, by performing the operation and storing the result in the NVM 1335 at this stage, rather than storing the argument information only, the NFS 1300 is able more quickly to determine whether the result of the operation performed by the remote device 1900 corresponds to the 'correct' response for given argument information, because the NFS 1300 does not have to perform the operation after the verification request reply signal has been received.

At step S119, the index value is incremented by a predetermined amount, in the present embodiment by '1'. At step S121 the NFS 1300 determines whether a predetermined maximum value of index has been reached, in the present embodiment a value of '32'. If the maximum value has been reached then at step S123 the index value is reset to a predetermined index baseline value, in the present embodiment a value of '1'. If the maximum value has not been reached then the method continues at step S125. It is to be understood that this implementation of circular buffer technology allows the software to use static arrays which can be helpful in proving deterministic behaviour in the context of functional safety and compliance with required standards such as the International Standards Organisation (ISO) 26262 functional safety standard and the Motor Industry Software Reliability Association (MISRA) standard. At step S125 the NFS 1300 stores the current value of index, the current value of time output by the timer function 1325 and the result of the operation using the generated argument information in the NVM 1335. At step S127 the NFS 1300 transmits to the remote device 1900 the argument information and value of Op_Idx (indicative of the operation to be performed) generated at step S113 together with the value of index Idx stored in the NVM at step S125. That is, the NFS 1300 transmits a 'challenge' to the remote device 1900 for the remote device 1900 to perform in order that the NFS 1300 may confirm correct functioning (or operation) of the remote device 1900.

At step S129 the NFS 1300 determines an amount of time that has elapsed since the most recent value of periodic timer start value was stored. It does this by comparing the current value of time information output by the local timer function 1330 with the stored periodic timer start value. If the difference between the values exceeds a predetermined amount, the NFS 1300 determines that the periodic timer function has expired and the method continues at step S109 else step S129 is repeated. In the present embodiment, the method is configured such that the NFS 1300 waits until a time period of at least 30 ms has elapsed since the most recent value of periodic timer start value was stored before continuing at step S109. Thus, the NFS 1300 is configured such that a period of at least 30 ms elapses between the transmission of successive verification request signals. It is to be understood that, by sending the challenges periodically, embodiments of the present invention can detect a failure in the form of a loss of communication irrespective of the communications protocol employed (whether Wi-Fi, Bluetooth or other). Upon receipt of a verification request signal from the NFS 1300 (via the GWM 1200 and TCU 1100), the remote device 1900 provides the received index value Idx, time information, Op_Idx value and argument information to a response generator function 1920 (FIG. 4(e)) that is implemented in computer program code by the remote device 1900. The response generator function 1920 is configured to perform the same predefined operation (defined by the value of Op_Idx) using the received argument information as that performed by the challenge generator function 1320 of the NFS 1300. The remote device 1900 then transmits the verification request reply signal back to the NFS 1300 via the TCU 110 and GWM 1200, the verification request reply signal including the result of the predefined operation using the received argument information and the corresponding index value and local time information received by the remote device 1900 from the NFS 1300.

Figure 7:
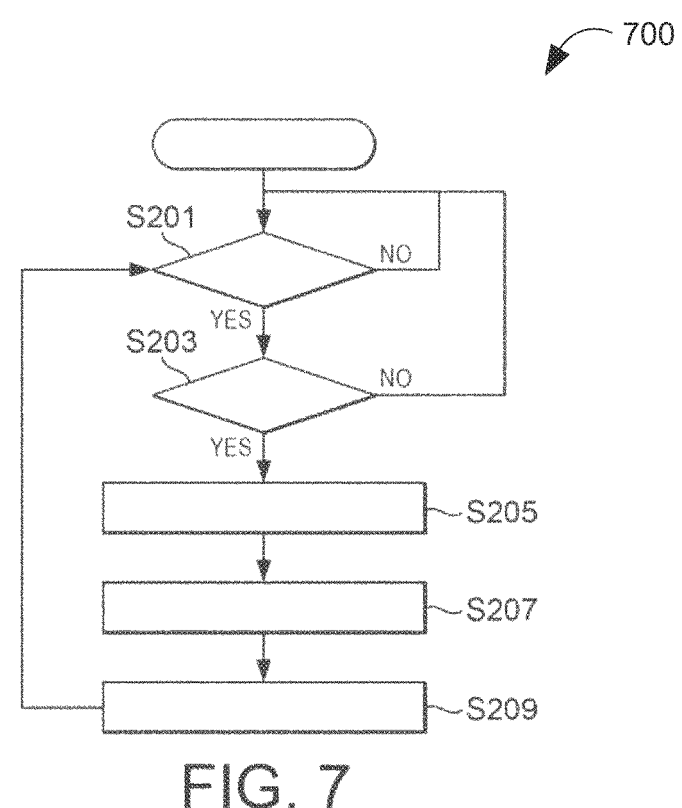
FIG. 7 is a flow diagram illustrating operation of the remote device.

FIG. 7 illustrates in further detail a process 700 of the operation of the remote device 1900. At step S201 the remote device 1900 checks whether it has established a communication link with the TCU 1100 of the vehicle 100. If a link has been established the method continues at step S203 else the method repeats step S201. At step S203 the remote device 1900 checks whether a verification request signal has been received from the NFS 1300 of the vehicle 1000. That is, the remote device 1900 determines whether a fresh 'challenge' has been received from the NGS 1300. If such a signal has been received the method continues at step S205 else the NFS 1300 continues at step S201. At step S205 the response generator function 1920 performs the predefined operation using the received argument information as described above, the predefined operation corresponding to that performed by the challenge generator function 1320 of the NFS 1300 and indicated by the value of Op_Idx. At step S207 the remote device 1900 combines the result of the predefined operation with the index value and time information received from the NFS 1300 by means of the verification request signal. At step S209 the remote device 1900 transmits the result of the predefined operation with the received index value in the form of a verification request reply signal to the NFS 1300. Thus, the verification request reply signal may be considered to comprise data corresponding to a response by the remote device 1900 to the challenge received from the NFS 1300. The method then continues at step S201.

Upon receipt of a verification request reply signal, the NFS 1300 is configured to check whether the value of the result of the predefined operation performed by the remote device 1900 (being the 'received operation result information') corresponds to the expected value (i.e. expected operation result information) stored by the NFS 1300 in the NVM 1335. As shown in FIG. 4, the NFS 1300 has a response validator 1340 that receives the verification request reply signal from the remote device 1900. The response validator 1340 retrieves from the NVM 1300 the previously stored value of the result of the predefined operation corresponding to the same index value Idx as that contained in the received verification request reply signal, together with the corresponding local time information stored in the NVM 1300. The response validator 1340 compares the stored value of the result of the predefined operation with that contained in the received verification request reply signal; if the values are the same, the response validator 1340 determines that a 'correct response' has been received. If they do not match, the response validator 1340 determines that a 'wrong response' has been received. The response validator 1340 then sets the value of the result of the operation stored in the NVM 1335 to a predetermined value, in the present embodiment a value of zero, by overwriting the stored response. As discussed below, this feature has the advantage that it prevents a malicious replay attack from taking place.

The response validator 1340 also checks the length of time that has elapsed between the time at which the challenge generator 1320 stored the information associated with the index value in the NVM 1335 and the time at which the verification request reply signal was received by the response validator 1340. It does this by storing the value of local time at which the verification request reply signal was received by the response validator 1340 in the NVM 1335 together with the information already stored in the NVM 1335 and associated with the same index value and comparing the two values of stored time information. If the amount of time that has elapsed exceeds a predetermined 'slow response' threshold value, the response validator 1340 determines that the verification request reply signal corresponds to a 'slow response'. Similarly, if the expected value of the predefined operation does not correspond to the value contained in the verification request reply signal, the response validator 1340 determines that a 'wrong response' has been received. If the number of slow responses or the number of wrong responses exceeds a predetermined threshold value within a predetermined time period, the response validator 1340 is configured to cause the vehicle 100 to stop moving and prevent further movement of the vehicle 100 in response to the receipt of signals from the remote device 1900.

Figure 8:
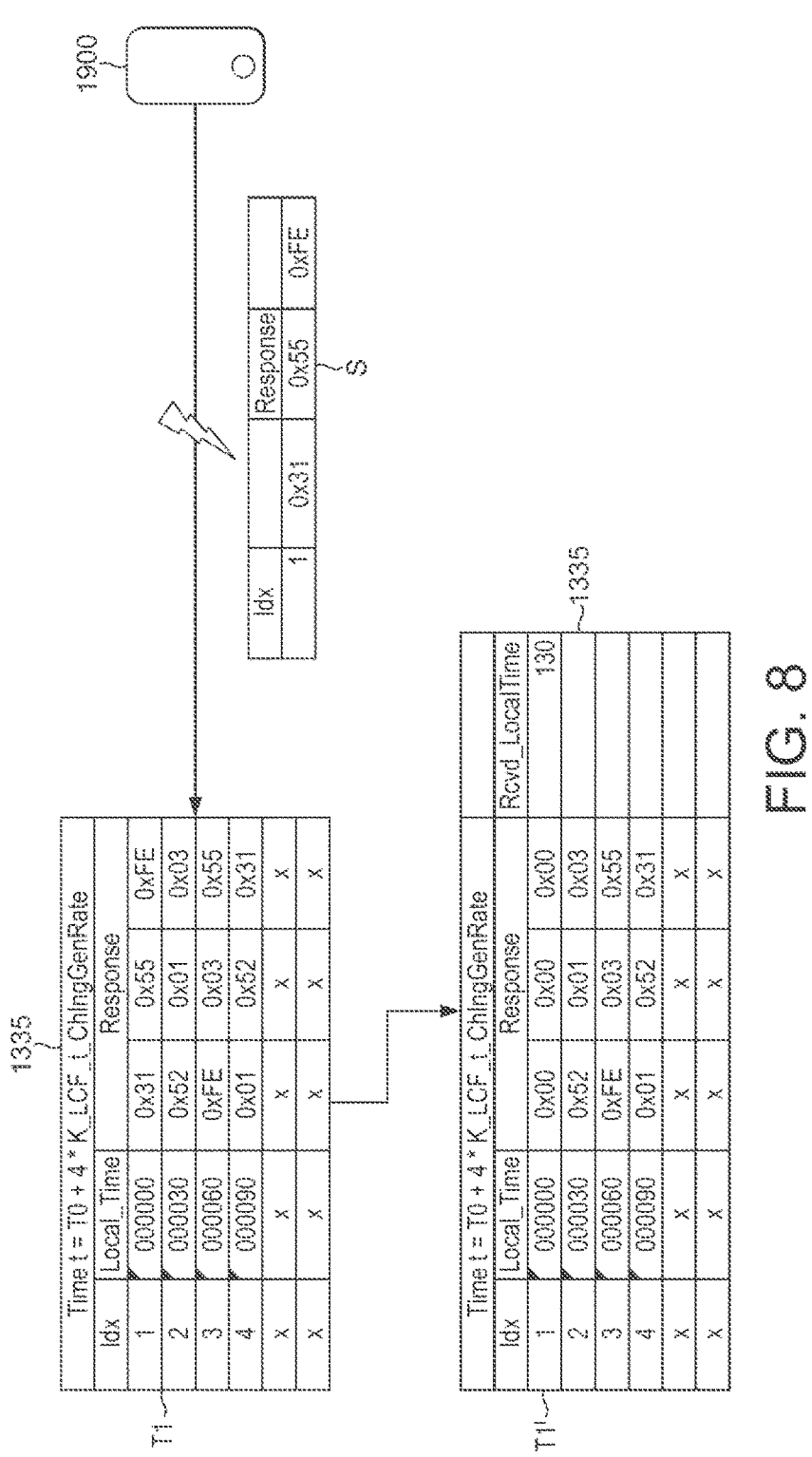
FIG. 8 illustrates the contents of the NVM before (block T1) and after (block T1') receipt of a first verification request reply signal from the remote device.

FIG. 8 illustrates the content of the NVM 1335 before (block T1) and after (block T1') receipt of a first verification request reply signal S from the remote device 1900. Immediately before receipt of the first verification request reply signal S, the NVM 1335 has data associated with four index values, Idx=1 to Idx=4, stored therein. As can be seen from block T1, the local time at which the first index value Idx=1 was stored was time '000000', with successive index values stored at time intervals of '000030', corresponding to 30 ms time intervals. The verification request reply signal S is received by the response validator 1340 when the local time is '000130'. Accordingly, the response validator 1340 stores the time at which the signal S was received in the NVM 1335 and associates the stored time value with the index value contained in the signal S, i.e. with the index value Idx=1, as illustrated in block T1' of FIG. 8. The response validator 1340 then compares the value of operation result with the value received in the verification request reply signal S to determine whether they match; in the present example they do match, and so the response validator 1340 sets the stored value of operation result to zero, as also illustrated in block T1'. It is to be understood that according to the present embodiment the NFS 1300 only starts to check for failure in respect of communications based on time elapsed once the first reply has been received. This feature reduces a computational burden placed on the NFS 1300 by allowing it to accommodate communication time delays associated with the system in this way. Furthermore, this feature also mitigates the problem that the NFS 1300 determines that a 'time out' failure has occurred whilst communication is being established initially with the remote device 1900. Accordingly, once the first reply is received, the NFS 1300 expects consecutive responses to arrive periodically, in the present embodiment every 30 ms.

Figure 9:
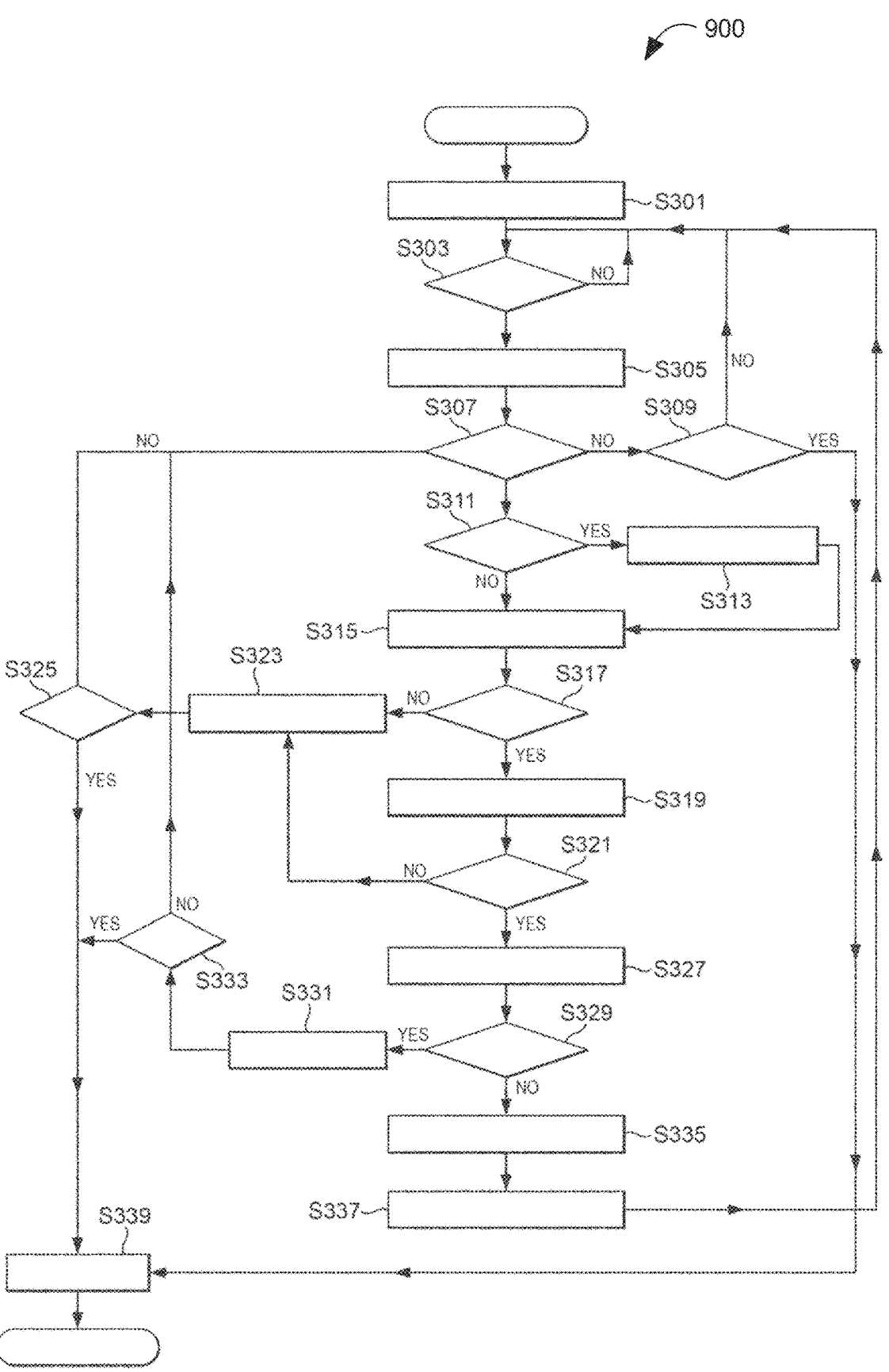
FIG. 9 is a flow diagram illustrating operation of the NFS when receiving a verification request reply signal from the remote device.

Operation of the NFS 1300 in respect of the receipt of verification request reply signals will now be described in further detail. With reference to flow diagram 900 at FIG. 9, at step S301 the response validator 1340 initializes an inactivity timer. The response validator 1340 may achieve this by setting an initial value of the inactivity timer to a predetermined value such as zero. At step S303 the response validator 1340 checks whether a remote device 1900 has established a connection with the TCU 1100. If such a connection has been made the response validator 1340 continues at step S305 else it repeats step S303. At step S305 the response validator 1340 starts the inactivity timer if it has not already been started. At step S307 the response validator 1340 checks whether a new verification request reply signal has been received. That is, whether a new response has been received from the remote device 1900 to a challenge transmitted to it by the NFS 1300. If a new verification request reply signal has been received the response validator 1340 continues at step S311 else the response validator 1340 continues at step S309. At step S309 the response validator checks whether the time elapsed since the inactivity timer was started exceeds an inactivity threshold value. If the elapsed time does exceed the inactivity threshold, response validator 1340 continues at step S339 else the response validator 1340 continues at step S303.

At step S311 the response validator 1340 determines whether the response received is the first response since the response validator 1340 determined that a remote device was connected at step S303. If this is the case then the response validator 1340 continues at step S313 else the response validator 1340 continues at step S315. At step S313 the response validator 1340 determines an overall latency value being a difference between the current local time information generated by the local timer 1330 and the time at which the first verification request signal was sent to the remote device 1900 by the challenge generator 1320 following the determination that a remote device 1900 was connected at step S109 of FIG. 6. The time at which the first verification request signal was sent to the remote device 1900 by the challenge generator 1320 is obtained by reference to the stored time information corresponding to the first index value (Idx=1). It is to be understood that this feature allows the NFS 1300 to automatically estimate the overall latency of signal transmission from the NFS 1300 (acting as challenger) to the remote device 1900 (acting as responder) and back to the NFS 1300 (as challenger), and eliminates a requirement for manual tuning. This measurement in respect of latency is stored and can be later used to detect abnormal responses in some embodiments, such as responses that took an unacceptably long time to be received by the NFS 1300.

At step S315 the response validator 1340 extracts from the newly received verification request reply signal the index value Idx and records the current value of local time information generated by the local timer function 1330. At step S317 the response validator 1340 determines whether an entry exists in the NVM 1335 corresponding to the value of index Idx received, i.e. an entry with the same index value. If a corresponding entry does exist, the response validator 1340 continues at step S319 else the response validator 1340 continues at step S323. At step S323 the response validator 1340 increments a wrong response counter value and continues at step S325. It is to be understood that the checking by the response validator for a corresponding entry with the same index value in the NVM 1335 and incrementing the wrong response counter if such an entry is not found enables the system to prevent a 'brute force' attack where a third party injects signals with all possible combinations of values of parameters, or randomly generated combinations of values of parameters. This feature also detects cases where the index value is wrongly transmitted back to the challenger by the responder (in the present embodiment, back to the NFS 1300 by the remote device 1900), due for example to errors associated with hardware or software. At step S325 the response validator 1340 checks whether the wrong response counter value exceeds a wrong response counter threshold value; if the wrong response counter value does exceed the wrong response counter threshold value then the response validator 1340 continues at step S339 else the response validator 1340 continues at step S307. It is to be understood that the wrong response counter threshold value may be set to any desired value, for example to a value dependent on a given application use case, taking into account the communications protocols employed. The value may for example be 2, 3, 4, 5, 10 or any other suitable value. At step S339 the response validator 1340 interrupts or cancels control of the vehicle 1000 by the remote device 1900, that is the NFS 1300 no longer permits the remote device 1900 to control vehicle motion. In the present embodiment, the NFS 1300 causes a braking system of the vehicle 1000 to stop the vehicle immediately. As noted above, if at step S317 the response validator 1340 determines that an entry exists in the NVM 1335 corresponding to the value of index Idx received, the response validator 1340 continues at step S319. At step S319 the response validator 1340 retrieves from the NVM 1335 the value of operation result information and local time information associated with the value of index Idx corresponding to that of the received verification request reply signal. At step S321 the response validator 1340 determines whether the value of operation result contained in the verification request reply signal is the same as the corresponding operation result information retrieved from the NVM 1335. That is, the NFS 1300 determines whether the response from the remote device 1900 to the challenge sent by the NFS 1300 corresponds to the expected, i.e. correct, response. If the value of operation result contained in the verification request reply signal is not the same as the corresponding operation result information retrieved from the NVM 1335, the response validator 1340 continues at step S323 else the response validator 1340 continues at step S327. At step S327 the response validator 1340 calculates a signal delay value being a difference between the local time information generated by the local timer 1330 when the verification request reply signal was received and the time at which the challenge generator 1320 stored the corresponding operation result information in the NVM 1335. The signal delay value provides an indication of the time that elapsed between the NFS 1300 transmitting the verification request signal and the NFS 1300 receiving the verification request reply signal. At step S329 the response validator 1340 determines whether the signal delay value exceeds a predetermined signal delay value threshold value. If the signal delay value does exceed the threshold value, the response validator 1340 continues at step S331, else the response validator 1340 continues at step S335. In the present embodiment the signal delay value threshold value is 30 ms although other values may be useful in some embodiments. It is to be understood that, in the present embodiment, the signal delay threshold value is set to a value that does not exceed the period between transmissions by the NFS 1300 to the remote device 1900 of verification request signals. As discussed above, in some embodiments the period between transmissions by the NFS 1300 is 30 ms.

In some embodiments, the NFS 1300 may be configured to set the predetermined 'slow response' threshold value to a value that is dependent on the estimated overall latency value, such as a value that is equal to the estimated latency value multiplied by a predetermined factor. In some embodiments the latency value may be determined by the system to be around 10 ms and the predetermined factor may be around 3 or any other suitable value. It is to be understood that the factor may be chosen such that an amount of time that elapses before vehicle movement is prevented does not exceed a desired maximum value such as 100 ms, 200 ms, 300 ms, 400 ms, 500 ms, 1000 ms or any other desired maximum value. It is to be understood that the value of the factor may be selected taking into account additional vehicle system latencies such as latencies associated with a vehicle braking system. It is to be understood that the system may be configured such that the predetermined slow response threshold value cannot be set to a value higher than a predetermined maximum allowable value. As noted above, in the present embodiment, the signal delay threshold value is set to a value that does not exceed the period between transmissions by the NFS 1300 to the remote device 1900 of verification request signals. It is to be understood that, in some embodiments, the signal delay threshold value may be varied dynamically based at least in part on the overall latency value determined at step S313. In addition, or instead, in some embodiments the signal delay threshold value may be calculated based at least in part on the value of signal delay value calculated at step S327 for a predetermined number of past values, for example an average value over a predetermined number of past values, such as the past 5, 10, 15 or any suitable number of successive past values.

At step S331 the response validator 1340 increments a slow response counter and clears the stored operation result information from the NVM 1335 in respect of the index value associated with the received verification request reply signal. At step S333 the response validator 1340 determines whether the slow response counter exceeds a predetermined slow response counter threshold value. If the slow response counter does exceed the predetermined slow response counter threshold value, the response validator 1340 continues at step S339 (described above) else the method continues at step S307. It is to be understood that this feature helps to protect the system against a replay attack as described above, in which a correct response is received but from a third party (fraudulent) source. It also protects the system against errors in which the value of index Idx is corrupted by the remote device 1900 or in the course of transmission between the remote device 1900 and NFS 1300, but where the response received is also valid. The predetermined slow response counter threshold value may be set to any suitable value such as 3, 4, 5, 10, 15, 20 or any other suitable value. By way of example, it is to be understood that if the estimated overall latency value is 10 ms and the predetermined factor is 3 (and therefore the slow response threshold value will be 30 ms) and the predetermined slow response counter threshold value is 3, then if the system becomes systematically slow and response counter a response takes more than 30 ms to be received on three successive occasions, the NFS 1300 will execute step S339 and vehicle movement will be prevented. At step S335 the response validator 1340 clears the stored operation result information from the NVM 1335 in respect of the index value associated with the received verification request reply signal. At step S337 the response validator 1340 continues operation by proceeding to step S303.

Figure 10:
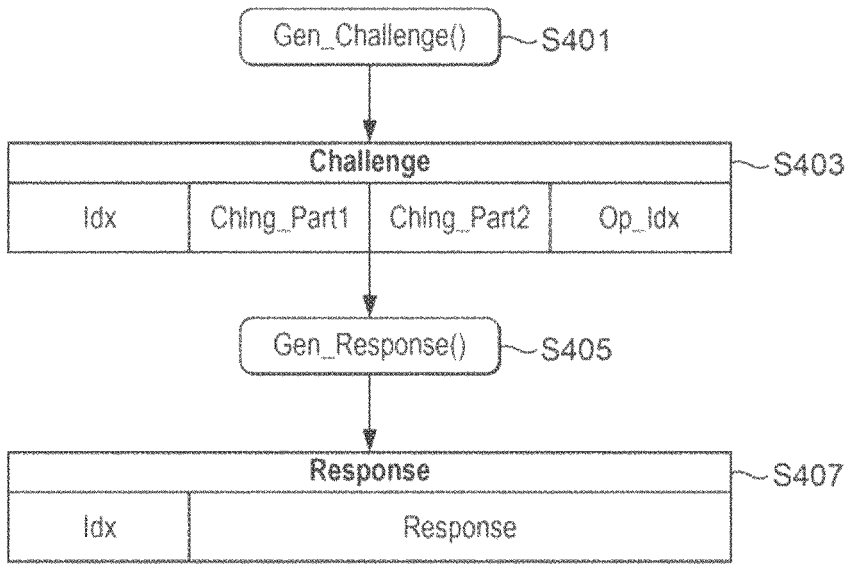
FIG. 10 illustrates a correspondence between the verification request signal and the verification request reply signal in the method of the embodiment of FIGS. 1 to 9.

FIG. 10 illustrates a correspondence between the verification request signal and the verification request reply signal in the method of the embodiment of FIGS. 1 to 9. At step S401 of FIG. 10, the challenge generator 1320 executes a function Gen_Challenge( ) in which it receives three random numbers from the random number generator 1325. The first is used to select the operation from a list of allowable operations for the current remote device state (the selected operation being identified by the value of Op_Idx), whilst the remaining two form the arguments Chlng_Part1, Chlng_Part2 referred to above as Part 1 and Part 2, respectively, for the predefined operation (i.e. the argument information for the predefined operation). At step S403 the challenge generator associates the argument information and value of Op_Idx with an index value Idx for transmission to the remote device 1900. The challenge generator 1320 also associates a local time value (not indicated in FIG. 10) with this information, although the local time value is not sent to the remote device 1900 in the present embodiment.

At step S405, the challenge generator 1320 performs the operation defined by the value Op_Idx using the generated argument information using the function Gen_Response( ). At step S407 the challenge generator 1320 stores the result of the operation, 'Response', in the NVM 1335 after checking that the result meets the requirement for being a valid result as described above. In some embodiments, the NFS 1300 is configured to prevent motion of the vehicle 1000 in response to a motion control signal received from the remote device 1900 in dependence on whether the order in which successive verification request reply signals are received corresponds to the order in which successive verification request signals were transmitted to the remote device 1900. If the NFS 1300 receives an out of sequence verification request reply signal, the NFS 1300 may increment an 'out of sequence' counter. If the counter is incremented by more than a predetermined number within a predetermined time period the NFS 1300 may prevent motion of the vehicle 1000 in response to motion control signals received from the remote device 1900. That is, the NFS 1300 may be configured to prevent motion of the vehicle 1000 in response to motion control signals received from the remote device 1900 in dependence on a number of times within a given time period the order in which successive verification request reply signals are received does not correspond to the order in which successive verification request signals were transmitted. It is to be understood that the present embodiment is able to detect a number of possible errors in respect of communication between the user and the NFS 1300. If hardware associated with the remote device 1900 fails or the wi-fi link between the remote device 1900 and the vehicle 1000 fails, a verification request reply signal will not be received by the NFS 1300 in response to transmission of a verification request signal by the NFS 1300. Furthermore, if corruption of the verification request signal or verification request reply signal occurs, the value of operation result performed using the argument information transmitted by the NFS 1300 will not match the corresponding value stored in the NVM 1335.

Some embodiments of the present invention may also distinguish between user inactivity and a stuck communications failure. In some embodiments, the NFS 1300 repeatedly requires the remote device 1900 to provide a response, by repeatedly transmitting the verification request signal. Thus, provided expected verification request reply signals are received, the NFS 1300 may determine that a stuck communications failure has not occurred even if a user is idle. Furthermore, by requiring the remote device 1900 to perform an operation using fresh argument information each time the verification request signal is received, the result of which cannot be predicted in advance of receipt of each verification request signal and the argument information it provides, the NFS 1300 may have increased confidence that the remote device 1900 is operating correctly. The feature that the response validator 1340 logs slow responses as well as wrong responses enables the response validator 1340 to detect when a state of communication between the user and NFS 1300 may be unsuitable for continued remote vehicle operation by means of the remote device 1900, and terminate remote vehicle operation. It is to be understood that this feature enables the system to respond to a user request to stop the vehicle 1000 within a given time limit even if an unexpected communications delay or failure takes place. It is to be understood that a way of continuing operation of the system in the presence of substantial time delays might be to increase the time period between transmission of successive verification request signals, for example from a value of 30 ms to a value of 60 ms. However, a period of such length might prevent the NFS 1300 from causing the vehicle 1000 to stop sufficiently quickly, for example in the event that a user requests the vehicle 1000 to stop, using the remote device 1900, and an excessive delay occurs between transmission of the verification request signal by the NFS 1300 and receipt of the corresponding verification request reply signal by the NFS 1300.

It is to be understood that, in the present embodiment, the NFS 1300 is configured only to generate and transmit the verification request signal to the remote device 1900 if the remote device 1900 is connected to the TCU 1100. If the connection becomes severed, for example if the remote device 1900 moves out of range or the wi-fi function of the remote device 1900 is switched off, the NFS 1300 terminates the sending of verification request signals.

Figures 11, 12:
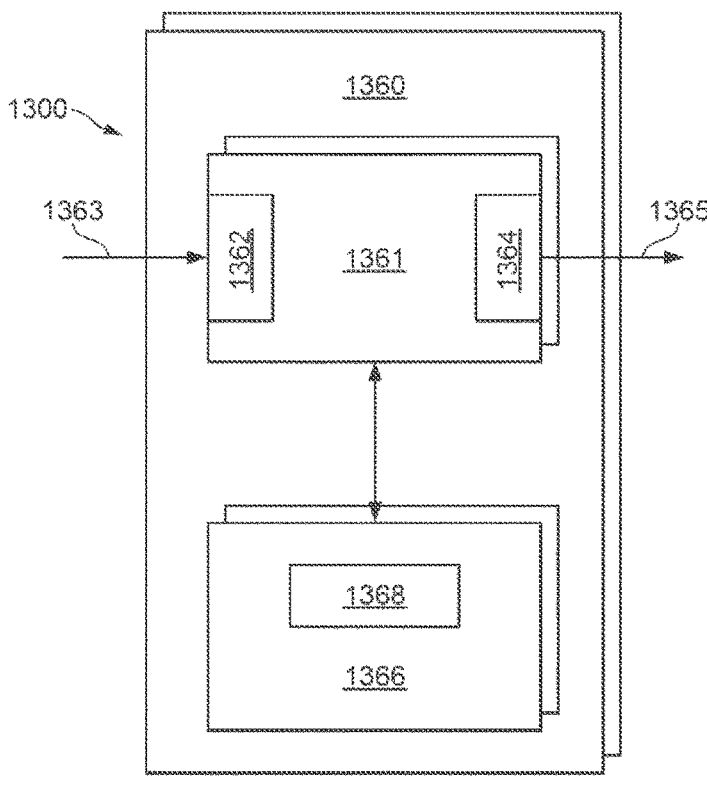
FIG. 11 illustrates a vehicle travelling along a path having a row of smart pillars along a side of the desired path in order to guide a path of travel of the vehicle.
FIG. 12 is a simplified illustration of a control system such as may be adapted in accordance with an embodiment of the present invention.

In some embodiments of the present invention, the NFS 1300 is configured to communicate with remote devices provided at fixed locations and which provide location information to the NFS 1300 in order to assist the NFS 1300 in causing the vehicle 1000 to travel to a desired location by providing guidance information. In an embodiment, smart pillars 2900 are provided at spaced apart locations at a side of a desired path of travel of a vehicle as illustrated schematically in FIG. 11. Each pillar 2900 is configured to sense a location of the vehicle 1000 relative to the pillar 2900 and provide relative location information to the NFS 1300, enabling the NFS 1300 to guide a path of the vehicle past the pillar 2900 without colliding with the pillar 2900. In some embodiments the NFS 1300 may be configured to guide the vehicle 1000 along a trajectory that causes the vehicle 1000 to pass a pillar 2900 at a desired distance from the pillar 2900. As illustrated in FIG. 11, a row of pillars 2900 may be provided along one side of a desired path of travel of a vehicle 1000. In some embodiments, smart pillars 2900 may be provided on both sides of a desired path of travel of a vehicle 1000. The NFS 1300 may be configured to communicate with the smart pillars 2900 using a similar methodology to that by which the NFS 1300 communicates with a remote device 1900. That is, using the challenge/response methodology described above with reference to FIGS. 1 to 10.

It is to be understood that some embodiments of the present invention have the advantage that they may be implemented substantially independently of the communication medium and protocol used. Some embodiments of the present invention have the advantage that they may be implemented substantially independently of the operating system or programming language used for the remote device software. Some embodiments have the advantage that they provide end to end protection by employing CRC technology. Some embodiments have the advantage that they provide end to end protection by detecting errors such as one or more of sequence errors in respect of verification request reply signals received by the vehicle in response to verification request signals transmitted by the vehicle, computational errors made by the remote device based on a challenge received from the NFS acting as challenger, timing errors and communication errors. Some embodiments have the advantage that they may function computationally faster and require less resources compared to methodologies employing complex data structures such as linked list methodologies. Some embodiments have the advantage that they enable decoupling of the development environment of the vehicle acting as challenger and remote device acting as responder. This enhances the vehicle developer's flexibility at least by reducing the constraints associated with equipment or software provided by a particular manufacturer or software developer, also referred to as vendor tie-in. This is at least in part because embodiments may be provided that do not rely on the use of a particular programming language or of particular computing hardware. As described herein, some embodiments of the present invention do not require synchronisation of time clocks between the vehicle and remote device. This is at least in part because in some embodiments the vehicle control electronics (the NFS 1300 in the embodiments described above) use a local time stamp and do not require timing information to be provided by the remote device. It is to be understood that a number of the parameters described herein are configurable in that the values employed may be changed according to a particular intended application. For example, the number of different index values stored in memory before the index values are overwritten may be varied according to the intended application.

As illustrated in FIG. 12, it is to be understood that the NFS 1300 comprises at least one controller 1360 that comprises at least one electronic processor 1361 having one or more electrical input(s) 1362 for receiving one or more input signal(s) 1363, and one or more electrical output(s) 1364 for outputting one or more output signal(s)) 1365. The or each controller 1360 further comprises at least one memory device 1366 electrically coupled to the at least one electronic processor 1361 and having instructions 1368 stored therein. The at least one electronic processor 1361 is configured to access the at least one memory device 1366 and execute the instructions 1368 stored therein so as to arranged to control, or provide input to a system to control, motion of a motor vehicle in response to a signal received from a remote device, wherein the at least one controller 1360 is arranged to perform a verification cycle in which the control system is configured to: transmit a verification request signal to the remote device; listen for a verification request reply signal transmitted from the remote device in response to the verification request signal transmitted; listen for a remote device state signal transmitted from the remote device providing remote device state information indicating in which one of a plurality of predefined states the remote device is currently operating, wherein the verification request signal comprises information that includes information indicative of an operation to be performed using the argument information, the information indicative of the operation to be performed being dependent on the remote device state information, the system being further configured to determine whether information comprised by the verification request reply signal received from the remote device includes expected operation result information being operation result information corresponding to the expected result of the operation defined by the information indicative of a operation to be performed provided in the verification request signal, wherein the system is configured to control, or provide input to a system to control, motion of the vehicle in response to a motion control signal received from the remote device in dependence on a correspondence between the received operation result information and the expected operation result information.

The, or each, electronic processor 1361 may comprise any suitable electronic processor (e.g., a microprocessor, a microcontroller, an ASIC, etc.) that is configured to execute electronic instructions. The, or each, electronic memory device 1366 may comprise any suitable memory device and may store a variety of data, information, threshold value(s), lookup tables or other data structures, and/or instructions therein or thereon. In an embodiment, the memory device 1366 has information and instructions for software, firmware, programs, algorithms, scripts, applications, etc. stored therein or thereon that may govern all or part of the methodology described herein. The processor, or each, electronic processor 1361 may access the memory device 1366 and execute and/or use that or those instructions and information to carry out or perform some or all of the functionality and methodology described herein. The at least one memory device 1366 may comprise a computer-readable storage medium (e.g. a non-transitory or non-transient storage medium) that may comprise any mechanism for storing information in a form readable by a machine or electronic processors/computational devices/computing device, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM or EEPROM); flash memory; or electrical or other types of medium for storing such information/instructions.

As noted above, it is to be understood that the or each controller 1360 can comprise a control unit or computational device having one or more electronic processors 1361 (e.g., a microprocessor, a microcontroller, an application specific integrated circuit (ASIC), etc.), and may comprise a single control unit or computational device, or alternatively different functions of the or each controller 1360 may be embodied in, or hosted in, different control units or computational devices. As used herein, the term "controller," "control unit," or "computational device" (or "computing device") will be understood to include a single controller, control unit, or computational device, and a plurality of controllers, control units, or computational devices collectively operating to provide the required control functionality. A set of instructions could be provided which, when executed, cause the controller 1360 to implement the control techniques described herein (including some or all of the functionality required for the method described herein). The set of instructions could be embedded in said one or more electronic processors of the controller 1360; or alternatively, the set of instructions could be provided as software to be executed in the controller 1360. A first controller or control unit may be implemented in software run on one or more processors. One or more other controllers or control units may be implemented in software run on one or more processors, optionally the same one or more processors as the first controller or control unit. Other arrangements are also useful. Example controllers 1360 have been described comprising at least one electronic processor 1361 configured to execute electronic instructions stored within at least one memory device 1366, which when executed causes the electronic processor(s) 1361 to carry out the method as hereinbefore described. However, it is contemplated that the present invention is not limited to being implemented by way of programmable processing devices, and that at least some of, and in some embodiments all of, the functionality and/or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

The invention claimed is:

1. A control system comprising one or more controllers, the control system arranged to control, or provide input to a system to control, motion of a motor vehicle in response to a motion control signal received from a remote device, wherein the control system is arranged to perform a verification cycle in which the control system is configured to:

transmit multiple verification request signals in succession to the remote device;

listen for verification request reply signals transmitted from the remote device in response to the multiple verification request signals in succession transmitted;

listen for a remote device state signal transmitted from the remote device providing remote device state information indicating in which one of a plurality of predefined states the remote device is currently operating, wherein the multiple verification request signals comprise information that includes operation information indicative of an operation to be performed, the operation information based on the remote device state information;

determine whether information comprised by the verification request reply signals received from the remote device includes expected operation result information being operation result information corresponding to an expected result of the operation defined by the operation information provided in the multiple verification request signals; and control, or provide input to the system to control, motion of the motor vehicle in response to the motion control signal received from the remote device based on a correspondence between the received operation result information and the expected operation result information.

2. The control system according to claim 1 wherein the operation information based on the remote device state information comprises the operation information being selected from a corresponding predetermined group of one or more operations associated with each of the said plurality of predefined states in which the remote device may operate.

3. The control system according to claim 2 wherein the one or more operations of each respective group of one or more operations are configured to cause the remote device to perform an operation that is expected to be performed by the remote device when it is operating in a corresponding predefined state as part of normal operation in that predefined state.

4. The control system according to claim 1, wherein the system is configured to determine expected operation result information and store the expected operation result information together with a respective identifier in a memory associated with the control system, the system being configured to include, in the multiple verification request signals, identifier information being information indicative of an identifier associated with the operation information comprised by the multiple verification request signals, wherein the system being configured to determine whether information comprised by the verification request reply signals received from the remote device includes expected operation result information comprises the system being configured to compare received result information and stored expected result information associated with the same identifier information.

5. The control system according to claim 4 configured wherein once a verification request reply signal has been received having identifier information therein and the system has compared received result information and stored expected result information associated with that identifier information, the system is configured not to compare further received expected result information associated with that identifier information until fresh expected result information has been stored corresponding to that identifier information.

6. The control system according to claim 5 wherein the system is configured wherein once the verification request reply signals has been received having identifier information therein and the system has compared received result information and corresponding stored expected result information associated with that identifier information, the system is configured to delete the stored expected result information and corresponding identifier information from memory.

7. The control system according to claim 1 configured to prevent motion of the motor vehicle in response to a motion control signal received from the remote device based on a number of times the verification request reply signals are received by the system within a prescribed time period where received result information does not correspond to corresponding stored expected result information.

8. The control system according to claim 1, wherein the multiple verification request signals are successive verification request signals, and wherein the control system is configured to prevent motion of the motor vehicle in response to a motion control signal received from the remote device based on whether an order in which successive verification request reply signals are received corresponds to an order in which the multiple successive verification request signals were transmitted.

9. The control system according to claim 8, wherein the verification reply signals are successive verification reply signals, wherein the system is configured to prevent motion of the motor vehicle in response to a motion control signal received from the remote device based on a number of times within a given time period the order in which the successive verification request reply signals are received does not correspond to the order in which the multiple successive verification request signals were transmitted.

10. The control system according to claim 1 configured to implement a cyclic redundancy check in respect of data received and to overwrite stored results based on the operation result information.

11. The control system according to claim 1 wherein the multiple verification request signals further comprise argument information indicative of one or more arguments to be employed in the operation to be performed.

12. The control system according to claim 1, wherein the multiple verification request signals in succession are part of a single verification cycle.

13. A method of controlling motion of a vehicle by a control system, the method comprising controlling, or providing input to a system to control, motion of a motor vehicle in response to a motion control signal received from a remote device, the method comprising performing a repeating verification cycle, the method comprising:

transmitting multiple verification request signals in succession to the remote device;

listening for verification request reply signals transmitted from the remote device in response to the multiple verification request signals transmitted;

listening for a remote device state signal transmitted from the remote device providing remote device state information indicating in which one of a plurality of predefined states the remote device is currently operating, whereby the multiple verification request signals comprises information that includes operation information indicative of an operation to be performed, the operation information based on the remote device state information;

determining whether information comprised by the verification request reply signals received from the remote device includes expected operation result information being operation result information corresponding to an expected result of the operation defined by the operation information provided in the multiple verification request signals; and controlling, or providing input to a system to control, motion of the motor vehicle in response to a motion control signal received from the remote device based on a correspondence between the received operation result information and the expected operation result information.

14. The method according to claim 13, wherein the validator uses both slow responses and wrong responses to detect when a state of communication between the user and NFS is unsuitable for continued remote vehicle operation by means of the remote device.

15. A remote device configured to communicate with a control system arranged to control, or provide input to a system to control, motion of a motor vehicle in response to a motion control signal received from the remote device, wherein the remote device is configured to:

transmit to the control system a remote device state signal providing information indicating in which one of a plurality of predefined states the remote device is currently operating;

listen for multiple verification request signals transmitted by the control system successively, wherein the multiple verification request signals comprise information that includes operation information indicative of an operation to be performed;

in response to receipt of the multiple verification request signals transmitted by the control system, perform the indicated predefined operation; and transmit verification request reply signals in response to receipt of the multiple verification request signals after performing the predefined operation, the verification request reply signals comprising information indicative of a result of the indicated predefined operation.

16. The remote device according to claim 15 configured to receive the multiple verification request signals further comprising argument information for the operation to be performed, the remote device being configured to perform the predefined operation using the received argument information, and the remote device further configured to perform an operation using fresh argument information each time one of the multiple verification request signals is received.

17. The remote device according to claim 15 configured to receive the multiple verification request signals further including identifier information being information indicative of an identifier associated with the operation information comprised by the multiple verification request signals, the remote device being configured to include, in the verification request reply signals, identifier information indicative of an identifier associated with the multiple verification request signals in response to which the verification request reply signals are being sent.

18. A method of controlling motion of a vehicle having a control system, the method comprising, by a remote device, communicating with a control system arranged to control, or provide input to a system to control, motion of a motor vehicle in response to a motion control signal received from the remote device, the method comprising:

transmitting to the control system a remote device state signal providing information indicating in which one of a plurality of predefined states the remote device is currently operating;

listening for multiple verification request signals transmitted by the control system in succession, whereby the multiple verification request signals comprise information that includes operation information indicative of a operation to be performed;

in response to receipt of the multiple verification request signals transmitted by the control system, performing the indicated predefined operation; and transmitting from the remote device the verification request reply signals in response to receipt of the multiple verification request signals after performing the predefined operation, the verification request reply signals comprising information indicative of a result of the indicated predefined operation.

19. A non-transitory, computer-readable storage medium storing instructions thereon that, when executed by one or more electronic processors, causes the one or more electronic processors to carry out the method of claim 13.

20. A non-transitory, computer-readable storage medium storing instructions thereon that, when executed by one or more electronic processors, causes the one or more electronic processors to carry out the method of claim 18.

* * * * *